(12) United States Patent
Seol et al.

(10) Patent No.: US 10,162,432 B2
(45) Date of Patent: Dec. 25, 2018

(54) DISPLAY DEVICE AND OPERATING METHOD THEREOF

(71) Applicant: LG ELECTRONICS INC., Seoul (KR)

(72) Inventors: Seongwoon Seol, Seoul (KR); Sangjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/469,093

(22) Filed: Mar. 24, 2017

(65) Prior Publication Data
US 2017/0277281 A1    Sep. 28, 2017

(30) Foreign Application Priority Data
Mar. 24, 2016 (KR) .................... 10-2016-0035575

(51) Int. Cl.
 *G06F 3/0346* (2013.01)
 *G06F 3/038* (2013.01)
 (Continued)

(52) U.S. Cl.
 CPC ............ *G06F 3/0346* (2013.01); *G06F 3/038* (2013.01); *G06F 3/0383* (2013.01); *G06F 3/04845* (2013.01); *G06F 3/04883* (2013.01); *H04M 1/72533* (2013.01); *H04N 21/4126* (2013.01); *H04N 21/4316* (2013.01); *H04N 21/44008* (2013.01); *H04N 21/4728* (2013.01); *G06F 2203/04806* (2013.01); *G06F 2203/04808* (2013.01); *H04M 2250/02* (2013.01); *H04M 2250/04* (2013.01); *H04M 2250/06* (2013.01);
 (Continued)

(58) Field of Classification Search
 CPC ....... G06F 3/0481; G06F 3/0488; G09G 5/14; H04N 5/44591; H04N 21/4316; H04N 21/440263
 See application file for complete search history.

(56) References Cited

U.S. PATENT DOCUMENTS 9,564,000 B2   2/2017  Higgins et al.
9,648,269 B2   5/2017  Park et al.
(Continued)

FOREIGN PATENT DOCUMENTS

EP         2541514        1/2013
KR     1019990025616      4/1999
(Continued)

OTHER PUBLICATIONS

PCT International Application No. PCT/KR2017/003104, International Search Report dated Jul. 21, 2017, 3 pages.

*Primary Examiner* — Shaheda Abdin
(74) *Attorney, Agent, or Firm* — Lee, Hong, Degerman, Kang & Waimey PC

(57) ABSTRACT

A method of operating a display device includes displaying a first image of first content, wherein the first image includes a target object, receiving information on a second coordinate of the target object included in a second image of the first content from a second display device, wherein the second image is temporally later than the first image, acquiring an image tracking the target object from the second image based on the information on the second coordinate of the target object, and displaying the acquired image.

16 Claims, 19 Drawing Sheets

(51) Int. Cl.
  *G06F 3/0484*  (2013.01)
  *H04M 1/725*  (2006.01)
  *H04N 21/41*  (2011.01)
  *H04N 21/431*  (2011.01)
  *H04N 21/44*  (2011.01)
  *H04N 21/4728*  (2011.01)
  *G06F 3/0488*  (2013.01)

(52) U.S. Cl.
  CPC .... *H04M 2250/12* (2013.01); *H04M 2250/22* (2013.01); *H04M 2250/52* (2013.01)

(56) References Cited

U.S. PATENT DOCUMENTS

| | | |
|---|---|---|
| 2010/0026721 A1 | 2/2010 | Park et al. |
| 2010/0302281 A1* | 12/2010 | Kim .................. G06F 3/04883 345/661 |
| 2014/0032635 A1* | 1/2014 | Pimmel .............. H04N 21/4126 709/203 |

FOREIGN PATENT DOCUMENTS

| | | |
|---|---|---|
| KR | 1020060106044 | 10/2006 |
| KR | 1020080010633 | 1/2008 |
| KR | 101009881 | 1/2011 |

* cited by examiner

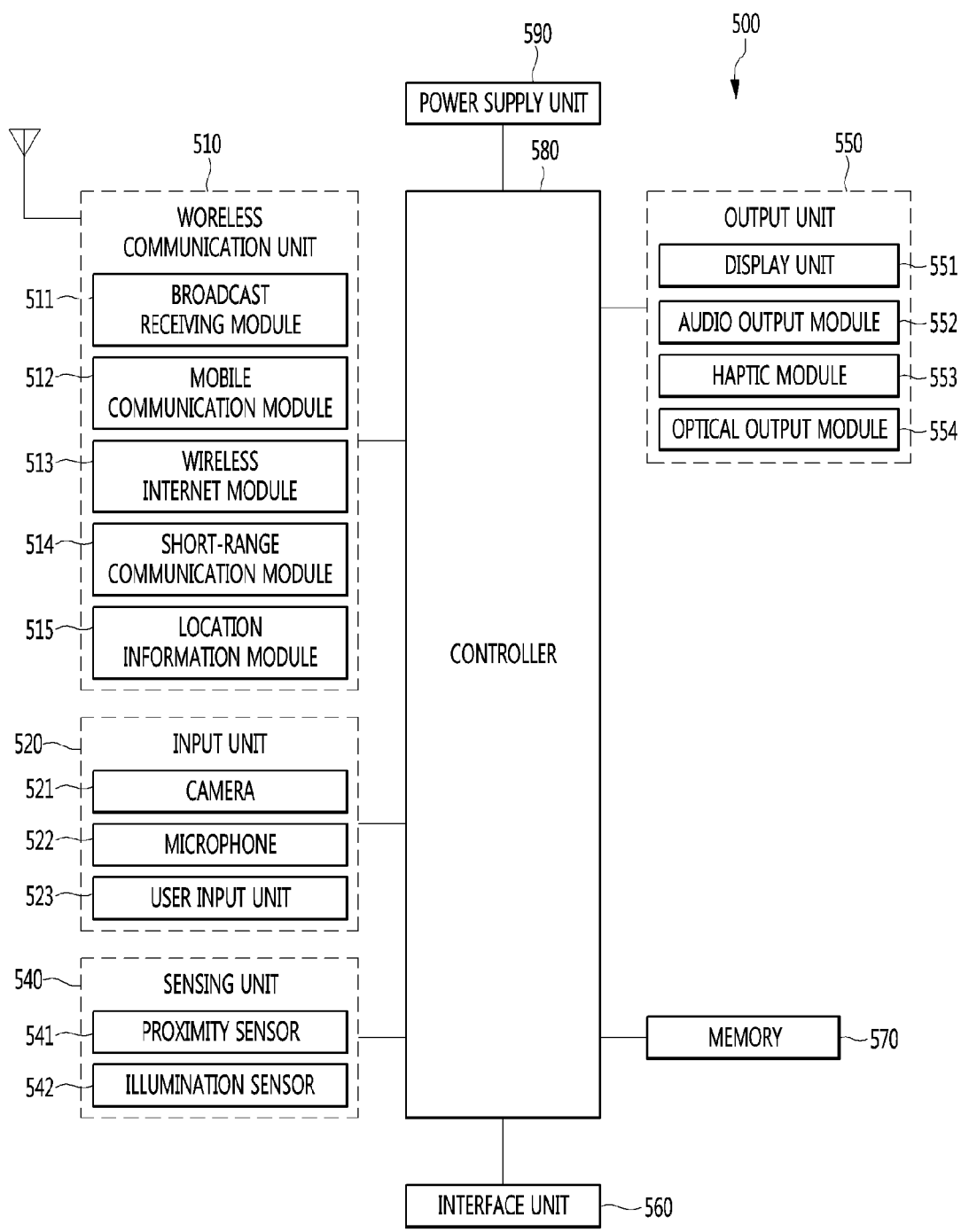

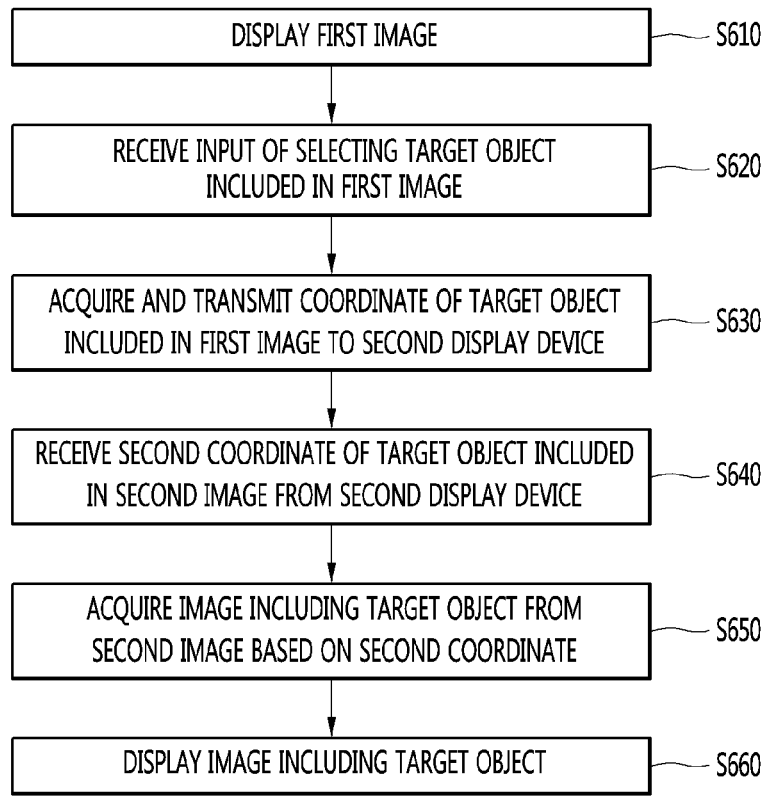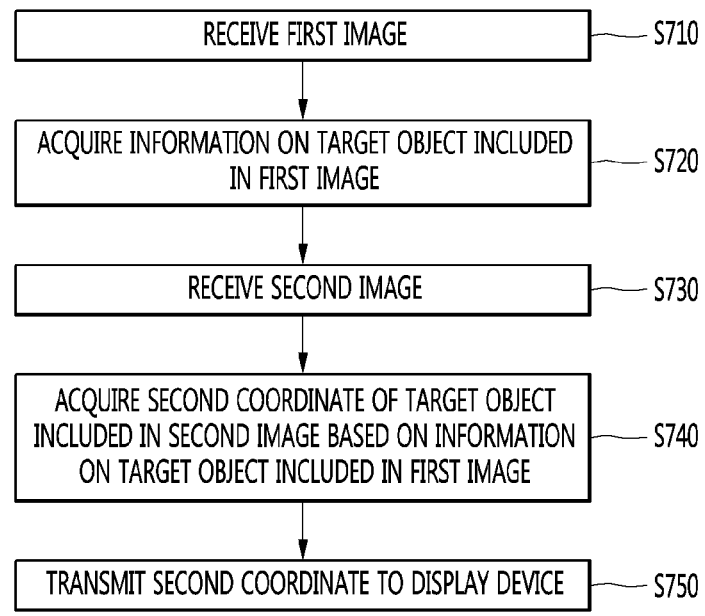

FIG. 8
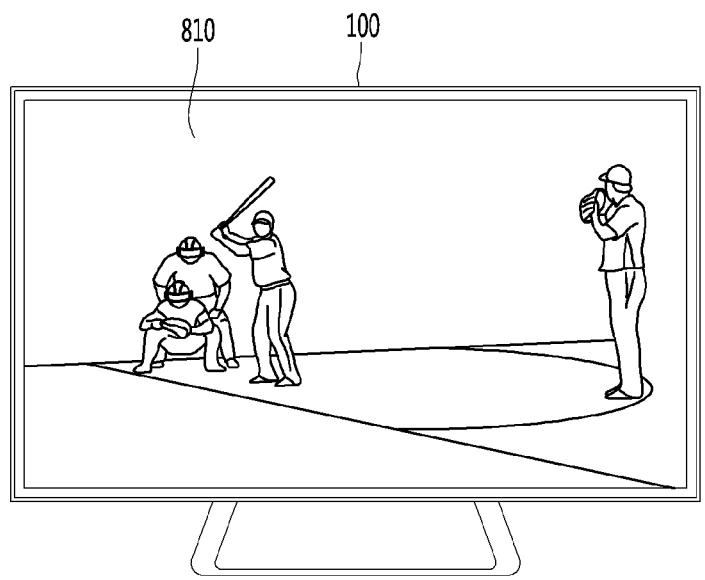
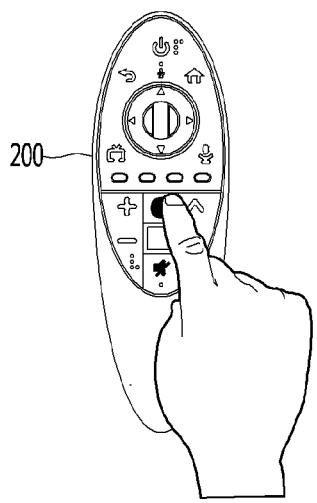

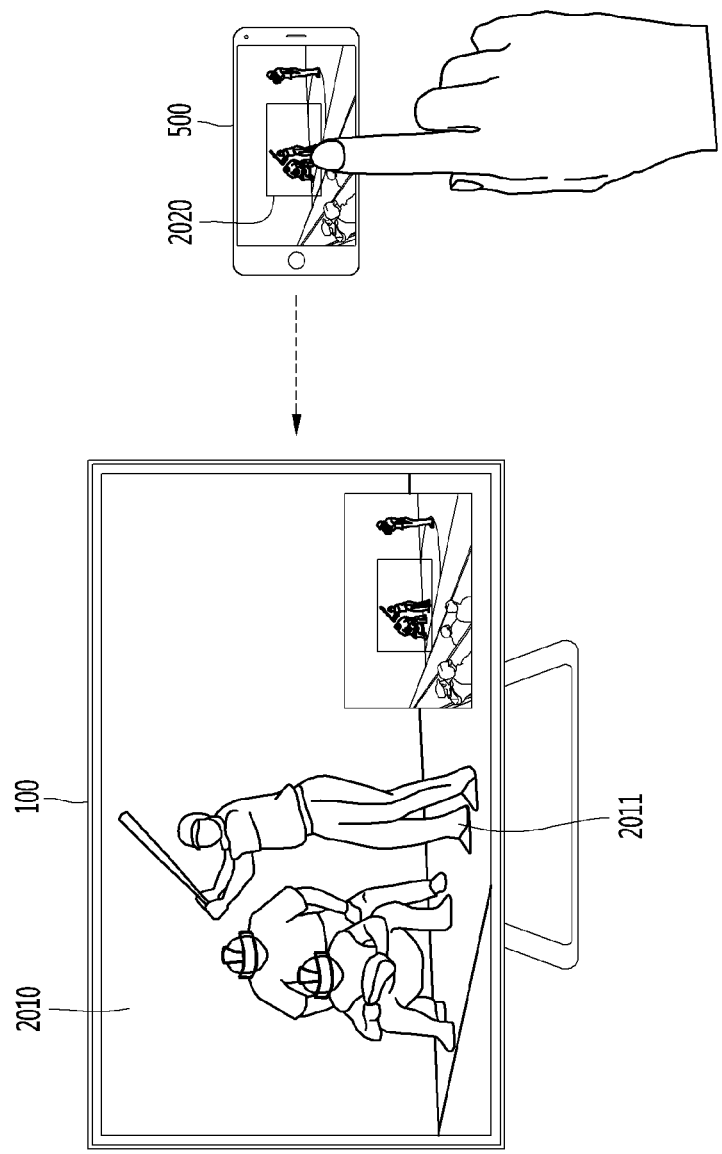

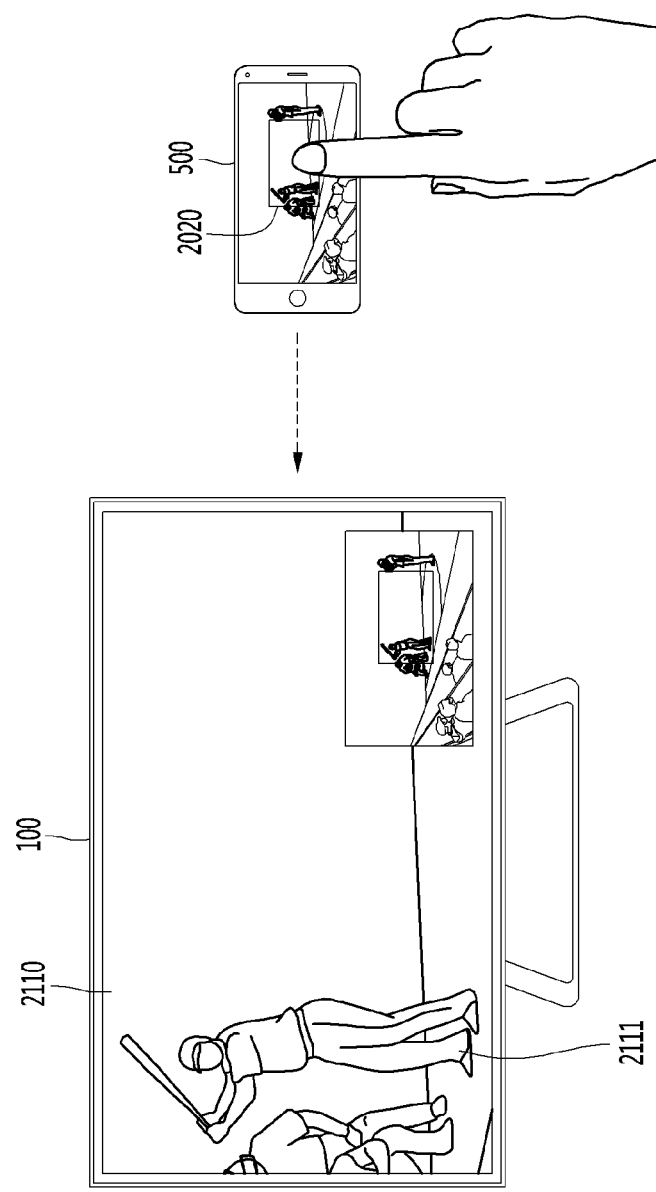

DISPLAY DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2016-0035575, filed on Mar. 24, 2016 in Korea, the contents of which are hereby incorporated by reference herein in its entirety.

BACKGROUND

Recently, digital TV services using a wired or wireless communication network have come into wide use. The digital TV services may provide various services which cannot be provided by an existing analog broadcast service.

For example, an Internet protocol television (IPTV) service as a digital TV service provides a bidirectional function for enabling a user to actively select the kind of a viewed program, a viewing time, etc. The IPTV service may provide various supplementary services, e.g., Internet search, homes hopping, online games, etc. based on the bidirectional function.

Meanwhile, recently, technology for providing a magnified image centered on a specific object using object tracking technology has appeared. If a football game is broadcast, an image of a specific player and the periphery thereof may be magnified and displayed.

Meanwhile, continuously tracking an object included in an image of a consecutive frame requires a high-speed operation. Accordingly, performing an operation for tracking an object in a TV is disadvantageous in terms of costs and resources.

SUMMARY

Therefore, the present invention has been made in view of the above problems, and it is an object of the present invention to provide a display device for tracking and displaying a specific object, which is capable of enabling another display device to track the object, and a method of operating the same.

According to a first aspect of the present invention, a method of operating a display device includes displaying a first image of first content, wherein the first image includes a target object, receiving information on a second coordinate of the target object included in a second image of the first content from a second display device, wherein the second image is temporally later than the first image, acquiring an image tracking the target object from the second image based on the information on the second coordinate of the target object, and, displaying the acquired image.

According to another aspect of the present invention, a method of operating a second display device includes receiving a first image of first content, acquiring information on a target object from one or more objects included in the first image, receiving a second image of the first content, wherein the second image is temporally later than the first image, acquiring information on a second coordinate of the target object included in the second image based on the information on the target object included in the first image, and transmitting the information on the second coordinate to the display device.

According to another aspect of the present invention, a display device includes a display unit for displaying an image, a communication unit for communicating with a second display device, and a control unit for controlling the display unit to display a first image of first content, wherein the first image includes a target object, receiving information on a second coordinate of the target object included in a second image of the first content from a second display device through the communication unit, wherein the second image is temporally later than the first image, acquiring an image tracking the target object from the second image based on the information of the second coordinate of the target object, and controlling the display unit to display the acquired image.

According to another aspect of the present invention, a second display device includes a communication unit for communicating with a display device, and, a control unit for receiving a first image of first content through the communication unit, acquiring information on a target object from one or more objects included in the first image, receiving a second image of the first content through the communication unit, wherein the second image is temporally later than the first image, acquiring information on a second coordinate of the target object included in the second image based on the information on the target object included in the first image, and transmitting the information on the second coordinate to the display device through the communication unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWING

The present invention will become more fully understood from the detailed description given herein below and the accompanying drawings, which are given by illustration only, and thus are not limitative of the present invention, and wherein:

FIG. 5 is a block diagram illustrating a mobile terminal related to the present invention;

FIG. 6 is a flowchart illustrating a method of operating a display device according to an embodiment of the present invention;

FIG. 7 is a flowchart illustrating a method of operating a second display device according to an embodiment of the present invention;

FIG. 8 is a flowchart illustrating a method of starting object tracking according to an embodiment of the present invention;

FIGS. 20 to 21 are diagrams illustrating a method of changing an acquisition region of an image including a specific object using a mobile terminal.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touchscreen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
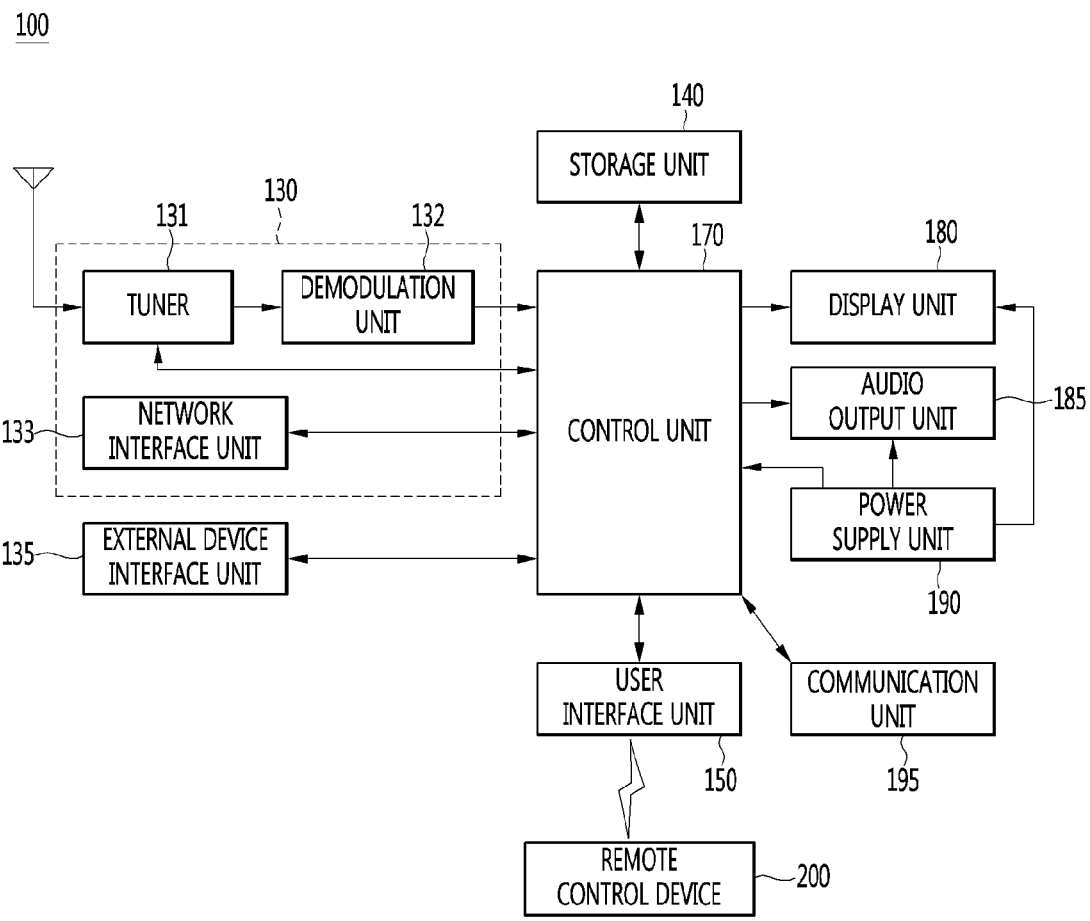
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a display unit 180, an audio output unit 185, a power supply unit 190, and a communication unit 195.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be output through the display unit 180. A sound signal of an external device inputted through the external device interface unit 135 can be output through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

The display unit 180 may convert an image signal, a data signal and an OSD signal processed by the control unit 170 or an image signal, a data signal or the like received through the external device interface 135 into RGB signals and generate driving signals.

The communication unit 195 may exchange information with another display device through wired or wireless communication. The communication unit 195 may include a short range communication module. The short range communication module may be used for short range communication.

Short range communication module can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

The communication unit 195 may be included in the control unit 170.

The block diagram of the image display device 100 illustrated in FIG. 1 is only exemplary. Depending upon the specifications of the image display device 100 in actual implementation, the components of the image display device 100 may be combined or omitted or new components may be added.

Furthermore, the display device 100 shown in FIG. 1 is just one embodiment of the present invention and thus, some of the components shown can be integrated, added, or omitted according to the specification of the actually implemented display device 100. That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Meanwhile, the display device 100 may include an external input interface (not shown) for performing the functions of the external device interface 135 and the communication unit 173. That is, the display device 100 may communicate with a connected external device through the external input interface (not shown) or perform wireless communication with an external device through the external input interface (not shown).

Meanwhile, the display device 100 may include an input unit (not shown). Here, the input unit (not shown) may include the user input interface 150 to perform operation of the user input interface 150. In addition, the input unit (not shown) may receive user input using a local key.

Figure 2:
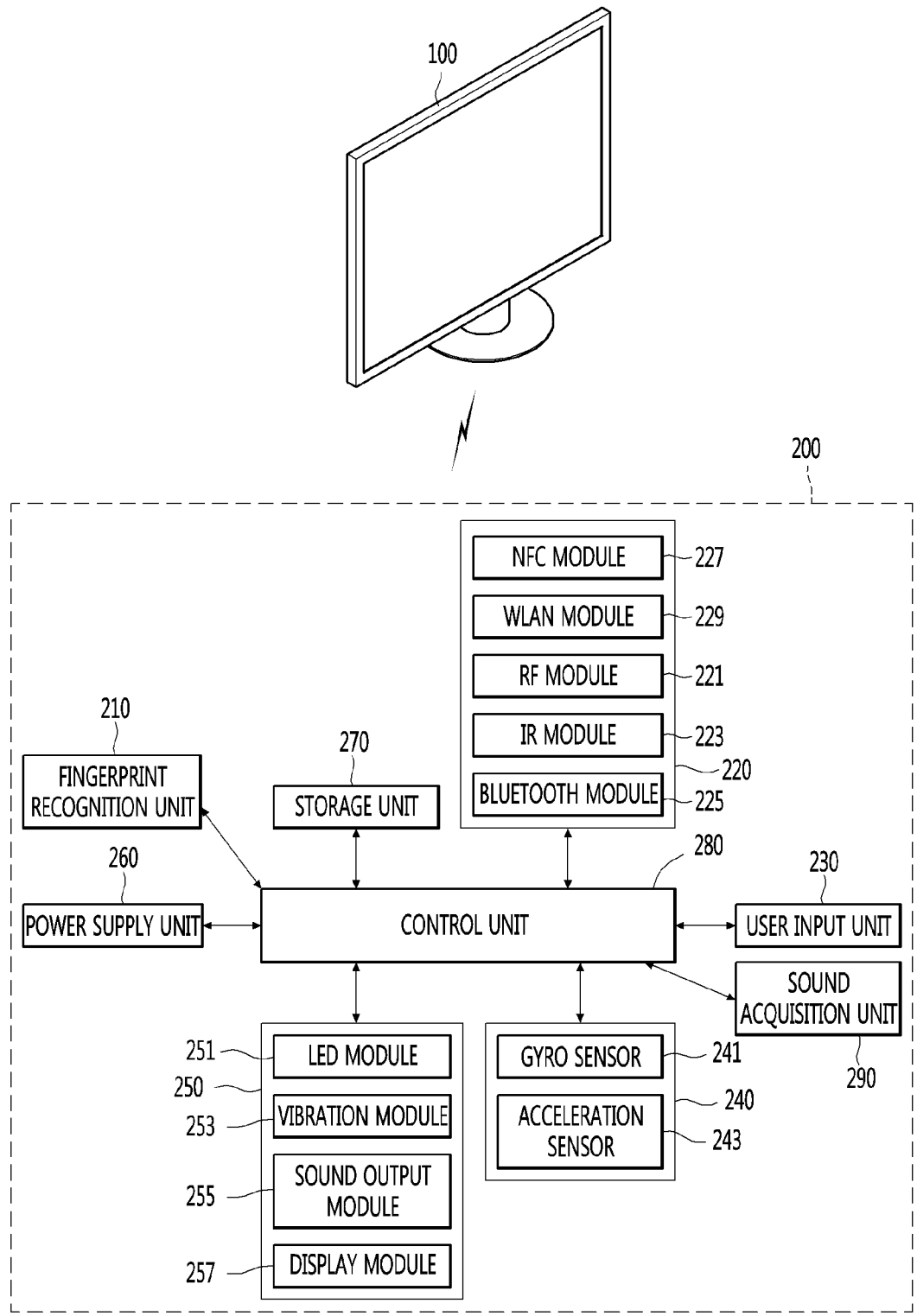
FIG. 2 is a block diagram illustrating a remote control device according to an embodiment of the present invention.
Figure 3:
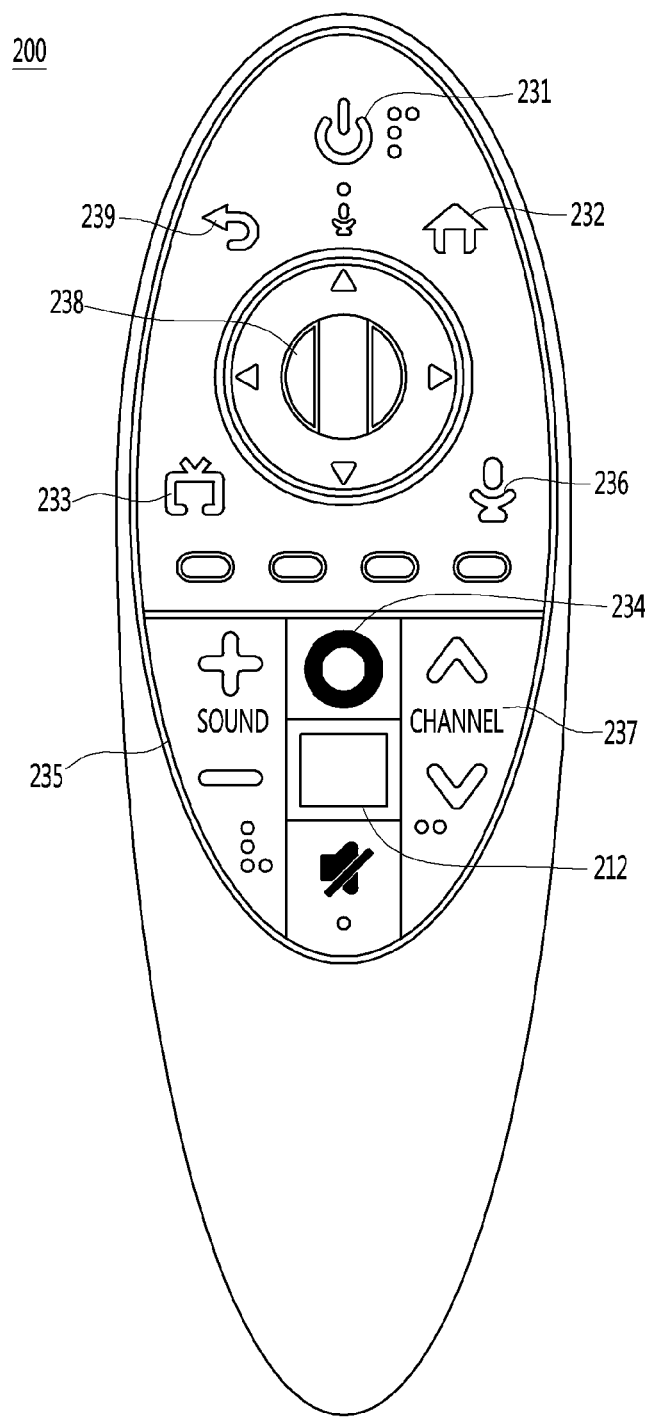
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touchscreen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touchscreen, a user can touch a soft key of the touchscreen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
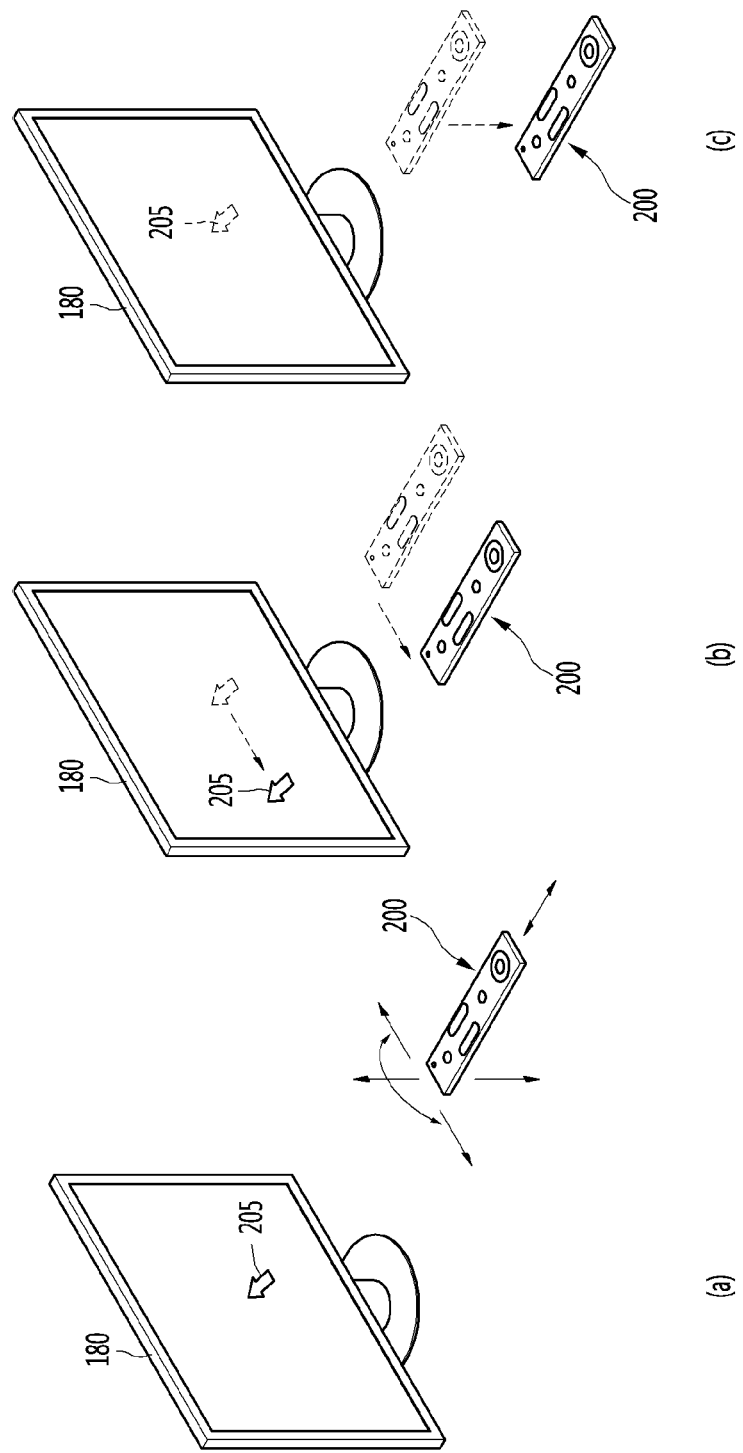
FIG. 4 is a view of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

FIG. 5 is a block diagram illustrating a mobile terminal related to the present invention.

The mobile terminal 500 is shown having components such as a wireless communication unit 510, an input unit 520, a sensing unit 540, an output unit 550, an interface unit 560, a memory 570, a controller 580, and a power supply unit 590. It is understood that implementing all of the illustrated components is not a requirement, and that greater or fewer components may alternatively be implemented.

Referring now to FIG. 5, the mobile terminal 500 is shown having wireless communication unit 510 configured with several commonly implemented components. For instance, the wireless communication unit 510 typically includes one or more components which permit wireless communication between the mobile terminal 500 and a wireless communication system or network within which the mobile terminal is located.

The wireless communication unit 510 typically includes one or more modules which permit communications such as wireless communications between the mobile terminal 500 and a wireless communication system, communications between the mobile terminal 500 and another mobile terminal, communications between the mobile terminal 500 and an external server. Further, the wireless communication unit 510 typically includes one or more modules which connect the mobile terminal 500 to one or more networks. To facilitate such communications, the wireless communication unit 510 includes one or more of a broadcast receiving module 511, a mobile communication module 512, a wireless Internet module 513, a short-range communication module 514, and a location information module 515.

The input unit 520 includes a camera 521 for obtaining images or video, a microphone 522, which is one type of audio input device for inputting an audio signal, and a user input unit 523 (for example, a touch key, a push key, a mechanical key, a soft key, and the like) for allowing a user to input information. Data (for example, audio, video, image, and the like) is obtained by the input unit 520 and may be analyzed and processed by controller 580 according to device parameters, user commands, and combinations thereof.

The sensing unit 540 is typically implemented using one or more sensors configured to sense internal information of the mobile terminal, the surrounding environment of the mobile terminal, user information, and the like. For example, in FIG. 5, the sensing unit 540 is shown having a proximity sensor 541 and an illumination sensor 542.

If desired, the sensing unit 540 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 521), a microphone 522, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 500 may be configured to utilize information obtained from sensing unit 540, and in particular, information obtained from one or more sensors of the sensing unit 540, and combinations thereof.

The output unit 550 is typically configured to output various types of information, such as audio, video, tactile output, and the like. The output unit 550 is shown having a display unit 551, an audio output module 552, a haptic module 553, and an optical output module 554.

The display unit 551 may have an inter-layered structure or an integrated structure with a touch sensor in order to facilitate a touchscreen. The touchscreen may provide an output interface between the mobile terminal 500 and a user, as well as function as the user input unit 523 which provides an input interface between the mobile terminal 500 and the user.

The interface unit 560 serves as an interface with various types of external devices that can be coupled to the mobile terminal 500. The interface unit 560, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 500 may perform assorted control functions associated with a connected external device, in response to the external device being connected to the interface unit 560.

The memory 570 is typically implemented to store data to support various functions or features of the mobile terminal 500. For instance, the memory 570 may be configured to store application programs executed in the mobile terminal 500, data or instructions for operations of the mobile terminal 500, and the like. Some of these application programs may be downloaded from an external server via wireless communication. Other application programs may be installed within the mobile terminal 500 at time of manufacturing or shipping, which is typically the case for basic functions of the mobile terminal 500 (for example, receiving a call, placing a call, receiving a message, sending a message, and the like). It is common for application programs to be stored in the memory 570, installed in the mobile terminal 500, and executed by the controller 580 to perform an operation (or function) for the mobile terminal 500.

The controller 580 typically functions to control overall operation of the mobile terminal 500, in addition to the operations associated with the application programs. The controller 580 may provide or process information or functions appropriate for a user by processing signals, data, information and the like, which are input or output by the various components depicted in FIG. 5, or activating application programs stored in the memory 570. As one example, the controller 580 controls some or all of the components illustrated in FIG. 5 according to the execution of an application program that have been stored in the memory 570.

The power supply unit 590 can be configured to receive external power or provide internal power in order to supply appropriate power required for operating elements and components included in the mobile terminal 500. The power supply unit 590 may include a battery, and the battery may be configured to be embedded in the terminal body, or configured to be detachable from the terminal body.

Referring still to FIG. 5, various components depicted in this figure will now be described in more detail. Regarding the wireless communication unit 510, the broadcast receiving module 511 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 511 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 511 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 512.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 511 may be stored in a suitable device, such as a memory 570.

The mobile communication module 512 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 512 include audio call signals, video (telephony) call signals, or various formats of data to support communication of text and multimedia messages.

The wireless Internet module 513 is configured to facilitate wireless Internet access. This module may be internally or externally coupled to the mobile terminal 500. The wireless Internet module 513 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 513 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 513 performs such wireless Internet access. As such, the Internet module 513 may cooperate with, or function as, the mobile communication module 512.

The short-range communication module 514 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 514 in general supports wireless communications between the mobile terminal 500 and a wireless communication system, communications between the mobile terminal 500 and another mobile terminal 500, or communications between the mobile terminal and a network where another mobile terminal 500 (or an external server) is located, via wireless area networks. One example of the wireless area networks is a wireless personal area networks.

In some embodiments, another mobile terminal (which may be configured similarly to mobile terminal 500) may be a wearable device, for example, a smart watch, a smart glass or a head mounted display (HMD), which is able to exchange data with the mobile terminal 500 (or otherwise cooperate with the mobile terminal 500). The short-range communication module 514 may sense or recognize the wearable device, and permit communication between the wearable device and the mobile terminal 500. In addition, when the sensed wearable device is a device which is authenticated to communicate with the mobile terminal 500, the controller 580, for example, may cause transmission of data processed in the mobile terminal 500 to the wearable device via the short-range communication module 514. Hence, a user of the wearable device may use the data processed in the mobile terminal 500 on the wearable device. For example, when a call is received in the mobile terminal 500, the user may answer the call using the wearable device. Also, when a message is received in the mobile terminal 500, the user can check the received message using the wearable device.

The location information module 515 is generally configured to detect, calculate, derive or otherwise identify a position of the mobile terminal. As an example, the location information module 515 includes a Global Position System (GPS) module, a Wi-Fi module, or both. If desired, the location information module 515 may alternatively or additionally function with any of the other modules of the wireless communication unit 510 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 520 may be configured to permit various types of input to the mobile terminal 520. Examples of such input include audio, image, video, data, and user input. Image and video input is often obtained using one or more cameras 521. Such cameras 521 may process image frames of still pictures or video obtained by image sensors in a video or image capture mode. The processed image frames can be displayed on the display unit 551 or stored in memory 570. In some cases, the cameras 521 may be arranged in a matrix configuration to permit a plurality of images having various angles or focal points to be input to the mobile terminal 500. As another example, the cameras 521 may be located in a stereoscopic arrangement to acquire left and right images for implementing a stereoscopic image.

The microphone 522 is generally implemented to permit audio input to the mobile terminal 500. The audio input can be processed in various manners according to a function being executed in the mobile terminal 500. If desired, the microphone 522 may include assorted noise removing algorithms to remove unwanted noise generated in the course of receiving the external audio.

The user input unit 523 is a component that permits input by a user. Such user input may enable the controller 580 to control operation of the mobile terminal 500. The user input unit 523 may include one or more of a mechanical input element (for example, a key, a button located on a front and/or rear surface or a side surface of the mobile terminal 500, a dome switch, a jog wheel, a jog switch, and the like), or a touch-sensitive input, among others. As one example, the touch-sensitive input may be a virtual key or a soft key, which is displayed on a touchscreen through software processing, or a touch key which is located on the mobile terminal at a location that is other than the touchscreen. On the other hand, the virtual key or the visual key may be displayed on the touchscreen in various shapes, for example, graphic, text, icon, video, or a combination thereof.

The sensing unit 540 is generally configured to sense one or more of internal information of the mobile terminal, surrounding environment information of the mobile terminal, user information, or the like. The controller 580 generally cooperates with the sending unit 540 to control operation of the mobile terminal 500 or execute data processing, a function or an operation associated with an application program installed in the mobile terminal based on the sensing provided by the sensing unit 540. The sensing unit 540 may be implemented using any of a variety of sensors, some of which will now be described in more detail.

The proximity sensor 541 may include a sensor to sense presence or absence of an object approaching a surface, or an object located near a surface, by using an electromagnetic field, infrared rays, or the like without a mechanical contact. The proximity sensor 541 may be arranged at an inner region of the mobile terminal covered by the touchscreen, or near the touchscreen.

The proximity sensor 541, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 541 can sense proximity of a pointer relative to the touchscreen by changes of an electromagnetic field, which is responsive to an approach of an object with conductivity. In this case, the touchscreen (touch sensor) may also be categorized as a proximity sensor.

The term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 541 may sense proximity touch, and proximity touch patterns (for example, distance, direction, speed, time, position, moving status, and the like).

In general, controller 580 processes data corresponding to proximity touches and proximity touch patterns sensed by the proximity sensor 541, and cause output of visual information on the touchscreen. In addition, the controller 580 can control the mobile terminal 500 to execute different operations or process different data according to whether a touch with respect to a point on the touchscreen is either a proximity touch or a contact touch. A touch sensor can sense a touch applied to the touchscreen, such as display unit 551, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 551, or convert capacitance occurring at a specific part of the display unit 551, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 580. Accordingly, the controller 580 may sense which region of the display unit 551 has been touched. Here, the touch controller may be a component separate from the controller 580, the controller 580, and combinations thereof.

In some embodiments, the controller 580 may execute the same or different controls according to a type of touch object that touches the touchscreen or a touch key provided in addition to the touchscreen. Whether to execute the same or different control according to the object which provides a touch input may be decided based on a current operating state of the mobile terminal 500 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 580, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 521 typically includes at least one a camera sensor (CCD, CMOS etc.), a photo sensor (or image sensors), and a laser sensor.

Implementing the camera 521 with a laser sensor may allow detection of a touch of a physical object with respect to a 3D stereoscopic image. The photo sensor may be laminated on, or overlapped with, the display device. The photo sensor may be configured to scan movement of the physical object in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 551 is generally configured to output information processed in the mobile terminal 500. For example, the display unit 551 may display execution screen information of an application program executing at the mobile terminal 500 or user interface (UI) and graphic user interface (GUI) information in response to the execution screen information.

In some embodiments, the display unit 551 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense. A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 552 is generally configured to output audio data. Such audio data may be obtained from any of a number of different sources, such that the audio data may be received from the wireless communication unit 510 or may have been stored in the memory 570. The audio data may be output during modes such as a signal reception mode, a call mode, a record mode, a voice recognition mode, a broadcast reception mode, and the like. The audio output module 552 can provide audible output related to a particular function (e.g., a call signal reception sound, a message reception sound, etc.) performed by the mobile terminal 500. The audio output module 552 may also be implemented as a receiver, a speaker, a buzzer, or the like.

A haptic module 553 can be configured to generate various tactile effects that a user feels, perceive, or otherwise experience. A typical example of a tactile effect generated by the haptic module 553 is vibration. The strength, pattern and the like of the vibration generated by the haptic module 553 can be controlled by user selection or setting by the controller. For example, the haptic module 553 may output different vibrations in a combining manner or a sequential manner.

Besides vibration, the haptic module 553 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 553 can also be implemented to allow the user to feel a tactile effect through a muscle sensation such as the user's fingers or arm, as well as transferring the tactile effect through direct contact. Two or more haptic modules 553 may be provided according to the particular configuration of the mobile terminal 500.

An optical output module 554 can output a signal for indicating an event generation using light of a light source. Examples of events generated in the mobile terminal 500 may include message reception, call signal reception, a missed call, an alarm, a schedule notice, an email reception, information reception through an application, and the like.

A signal output by the optical output module 554 may be implemented in such a manner that the mobile terminal emits monochromatic light or light with a plurality of colors. The signal output may be terminated as the mobile terminal senses that a user has checked the generated event, for example.

The interface unit 560 serves as an interface for external devices to be connected with the mobile terminal 500. For example, the interface unit 560 can receive data transmitted from an external device, receive power to transfer to elements and components within the mobile terminal 500, or transmit internal data of the mobile terminal 500 to such external device. The interface unit 560 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 500 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 500 via the interface unit 560.

When the mobile terminal 500 is connected with an external cradle, the interface unit 560 can serve as a passage to allow power from the cradle to be supplied to the mobile terminal 500 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 570 can store programs to support operations of the controller 580 and store input/output data (for example, phonebook, messages, still images, videos, etc.). The memory 570 may store data related to various patterns of vibrations and audio which are output in response to touch inputs on the touchscreen.

The memory 570 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 500 may also be operated in relation to a network storage device that performs the storage function of the memory 570 over a network, such as the Internet.

The controller 580 may typically control the general operations of the mobile terminal 500. For example, the controller 580 may set or release a lock state for restricting a user from inputting a control command with respect to applications when a status of the mobile terminal meets a preset condition.

The controller 580 can also perform the controlling and processing associated with voice calls, data communications, video calls, and the like, or perform pattern recognition processing to recognize a handwriting input or a picture drawing input performed on the touchscreen as characters or images, respectively. In addition, the controller 180 can control one or a combination of those components in order to implement various exemplary embodiments disclosed herein.

The power supply unit 590 receives external power or provide internal power and supply the appropriate power required for operating respective elements and components included in the mobile terminal 500. The power supply unit 590 may include a battery, which is typically rechargeable or be detachably coupled to the terminal body for charging.

The power supply unit 590 may include a connection port. The connection port may be configured as one example of the interface unit 560 to which an external charger for supplying power to recharge the battery is electrically connected.

As another example, the power supply unit 590 may be configured to recharge the battery in a wireless manner without use of the connection port. In this example, the power supply unit 590 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

In this specification, the term "memory 570" may be used interchangeably with the term "storage unit 570".

Meanwhile, the input unit 520 of the mobile terminal 500 may include the sensing unit 540 and perform all functions performed by the sensing unit 540. For example, the input unit 520 may sense user touch input.

FIG. 6 is a flowchart illustrating a method of operating a display device according to an embodiment of the present invention.

The method of operating the display device according to the embodiment of the present invention may include step S610 of displaying a first image of first content including a target object, step S620 of receiving input of selecting the target object from among one or more objects included in the first image, step S630 of acquiring information on a first coordinate of the target object of the first image and transmitting the information on the first coordinate to a second display device, step S640 of receiving information on a second coordinate of the target object of a second image of the first content temporally later than the first image from the second display device, step S650 of acquiring an image tracking the target object from the second image based on the information on the second coordinate of the target object, and step S660 of displaying an image including the target object.

FIG. 7 is a flowchart illustrating a method of operating a second display device according to an embodiment of the present invention.

In FIG. 7, the method of operating the second display device according to the embodiment of the present invention may include step S710 of receiving a first image of first content including a target object, step S720 of acquiring information on a target object from among one or more objects included in the first image, step S730 of receiving a second image of the first content temporally later than the first image, step S740 of acquiring information on a second coordinate of the target object of the second image based on the information on the target object included in the first image, and step S750 of transmitting the information on the second coordinate to the display device.

Meanwhile, in the following description, assume that the display device is the display device 100 and the second display device is the mobile terminal 500.

FIG. 8 is a flowchart illustrating a method of starting object tracking according to an embodiment of the present invention.

The image 810 of the first content is currently being displayed on the screen of the display device 100.

Here, the first content may be broadcast content received from a broadcast provider. For example, the first content may be a football game received from a specific broadcast provider through a specific channel.

The first content may be all content which may be acquired through various routes and displayed on the display device 100 without being limited thereto. For example, the first content may be acquired from a peripheral device connected to the display device 100. As another example, the first content may be content, such as movies, advertisements, games, VOD or broadcast signals received from a content provider or a network operator, or information related thereto. As another embodiment, the first content may be provided by a predetermined webpage.

As another example, the first content may be acquired through various routes and stored in the storage unit 140.

Meanwhile, the control unit 170 may receive input of starting object tracking. More specifically, the control unit 170 may receive input of selecting a specific button included in the remote control device 200 or input of selecting a menu item displayed on the screen of the display device 100.

Meanwhile, when input of starting object tracking is received, the control unit 170 may communicate with the mobile terminal 500 located near the display device 100.

This will be described in detail with reference to FIGS. 9 to 10.

Figure 9:
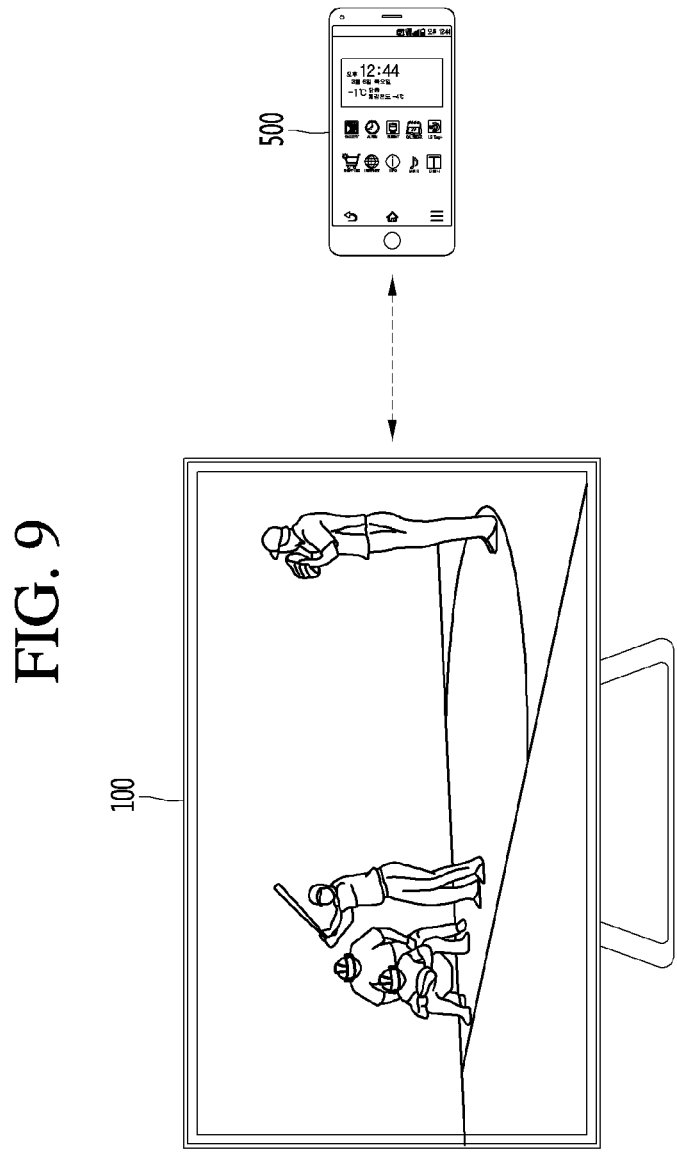
FIGS. 9 to 10 are diagrams illustrating a communication method of a display device and a mobile terminal according to an embodiment of the present invention.
Figure 10:
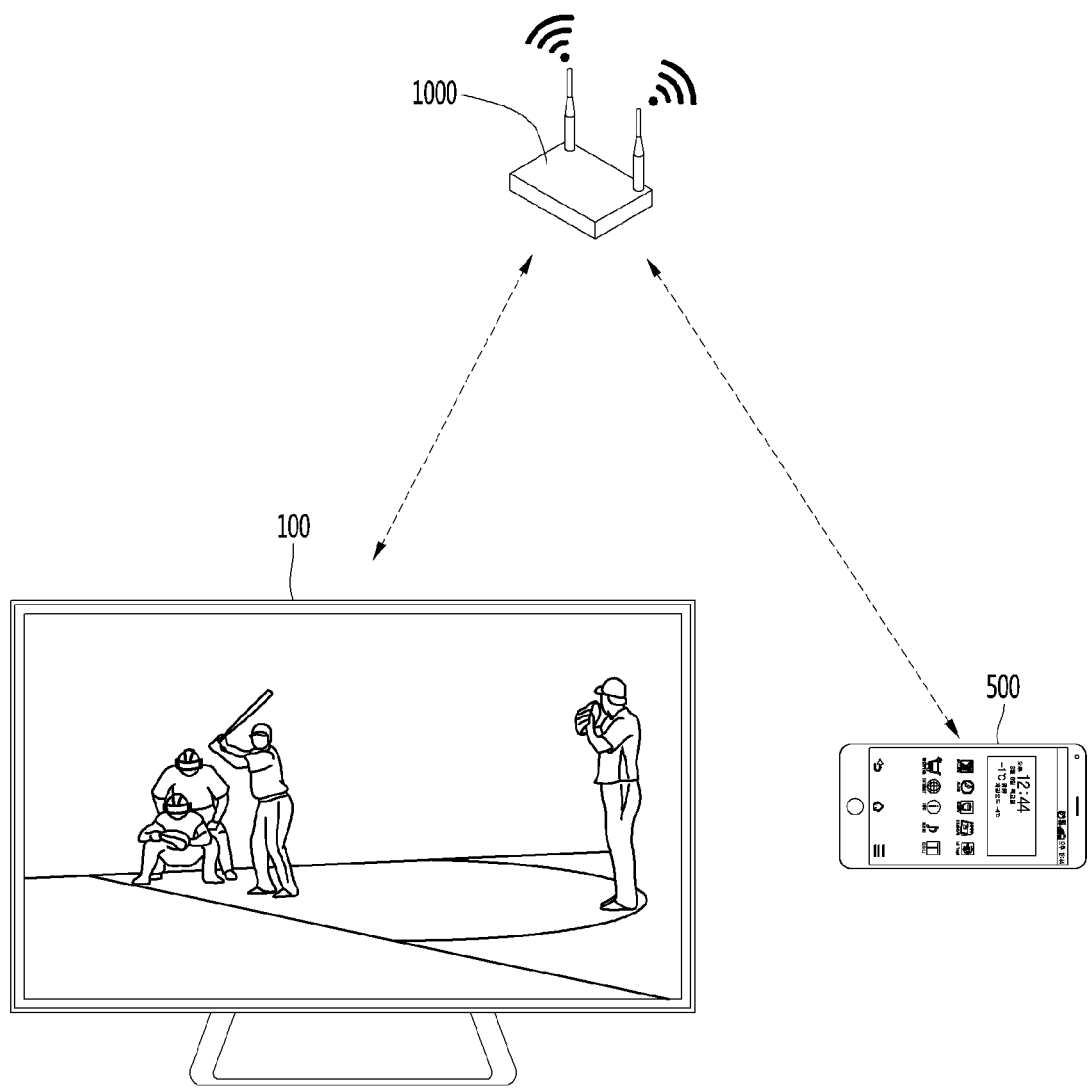

FIGS. 9 to 10 are diagrams illustrating a communication method of a display device 100 and a mobile terminal 500 according to an embodiment of the present invention.

When input of starting object tracking is received, the display device 100 may communicate with the mobile terminal 500 to transmit and receive data to and from the mobile terminal 500. Meanwhile, data communication between the display device 100 and the mobile terminal 500 described in the present invention is not limited to direct communication and may include communication through a router.

The communication unit 173 may communicate with the mobile terminal 500 through Bluetooth™, Wi-Fi direct, WiDi or other wired/wireless networking schemes. In addition, the communication unit 173 may communicate with the mobile terminal 500 using at least one of RFID (Radio Frequency Identification), Infrared Data Association (IrDA), UWB (Ultra Wideband), ZigBee, NFC (Near Field Communication), Wi-Fi (Wireless-Fidelity), Wi-Fi Direct and Wireless USB (Wireless Universal Serial Bus) technologies.

Meanwhile, the display device 100 and the mobile terminal 500 may be automatically paired as the mobile terminal 500 approaches the display device 100, regardless of input of starting object tracking. When input of starting object tracking is received, the display device 100 and the mobile terminal 500 may be paired to communicate with each other.

Meanwhile, as described with reference to FIG. 9, the display device 100 and the mobile terminal 500 may be directly connected to perform communication or may perform communication through a router.

More specifically, as shown in FIG. 10, the display device 100 may be connected to the router 1000 and the mobile terminal 500 may be connected to the router 1000. Data transmitted by the display device 100 may be transmitted to the mobile terminal 500 through the router 1000. In addition, data transmitted by the mobile terminal 500 may be transmitted to the display device 100 through the router 1000.

Meanwhile, some data may be directly transmitted between the display device 100 and the mobile terminal 500 and the other data may be transmitted between the display device 100 and the mobile terminal 500 through the router 1000.

For example, the images of the first content may be directly transmitted from the display device 100 to the mobile terminal 500 and the coordinates of the object included in the images of the first content may be transmitted from the mobile terminal 500 to the display device 100 through the router 1000.

Although the display device 100 and the mobile terminal 500 perform direct communication in the below description, the present invention is not limited thereto and, as described with reference to FIG. 10, data may be transmitted and received through the router 1000. In addition, some data may be directly transmitted and received and the other data may be transmitted and received through the router 1000.

Figure 11:
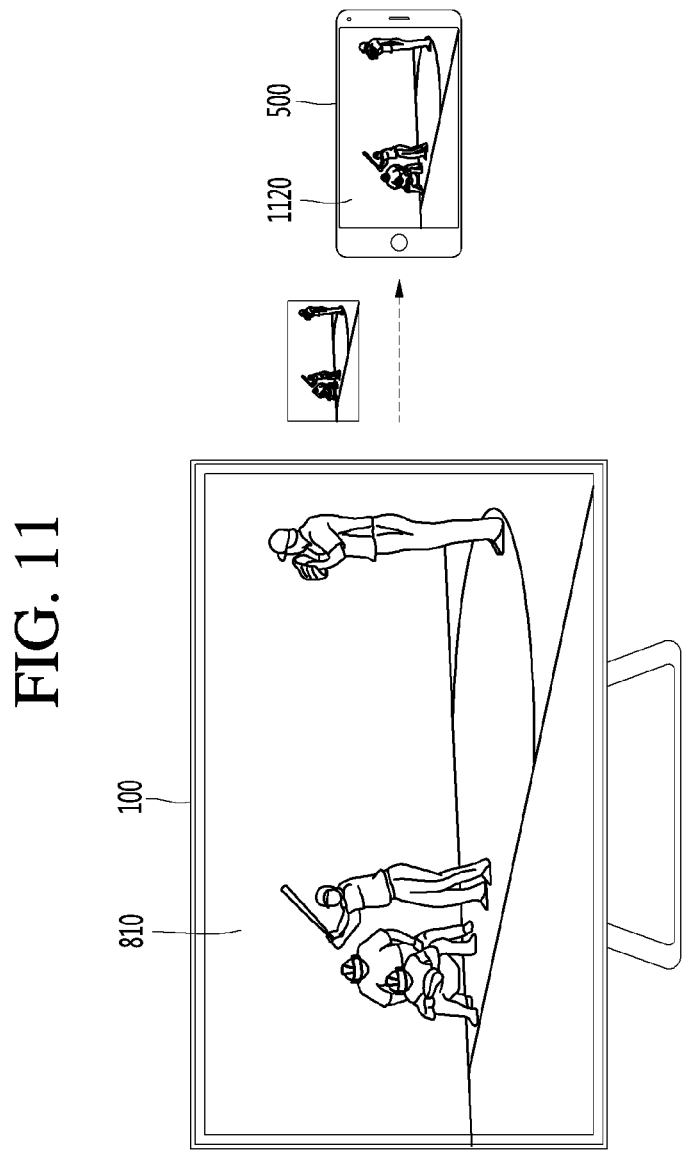
FIG. 11 is a diagram showing a display device 100 and a mobile terminal 500 sharing an image of first content according to an embodiment of the present invention.

FIG. 11 is a diagram showing a display device 100 and a mobile terminal 500 sharing an image of first content according to an embodiment of the present invention.

When the display device 100 and the mobile terminal 500 are paired, the display device 100 may transmit the image 810 of the first content displayed on the display device to the mobile terminal 500.

In this case, the mobile terminal 500 may receive the image of the first content from the display device 100 and display the received image 1120 of the first content.

Figure 12:
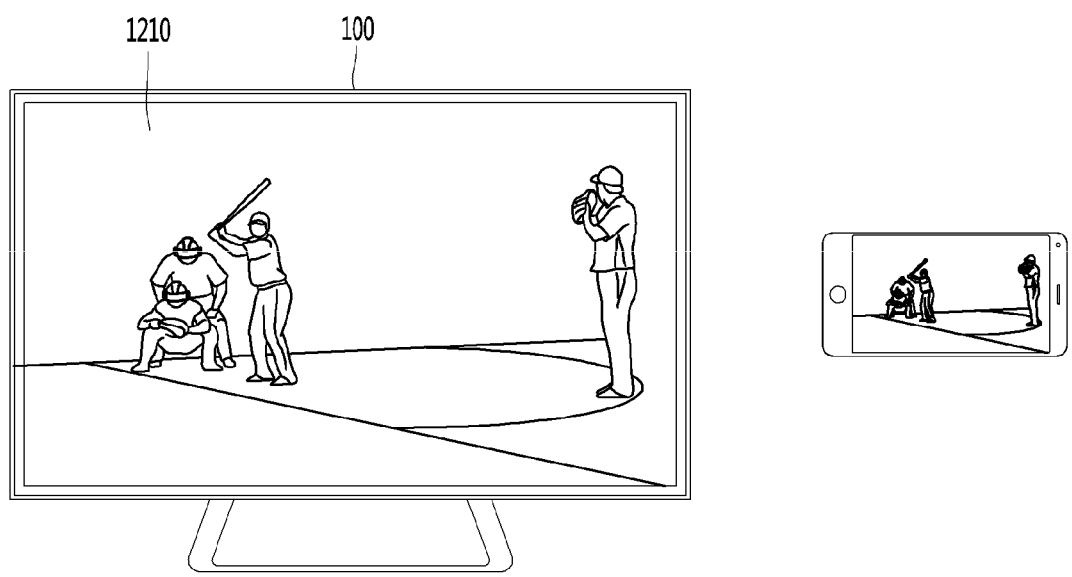
FIGS. 12 to 13 are diagrams illustrating a method of selecting an object to be tracked according to an embodiment of the present invention.
Figure 13:
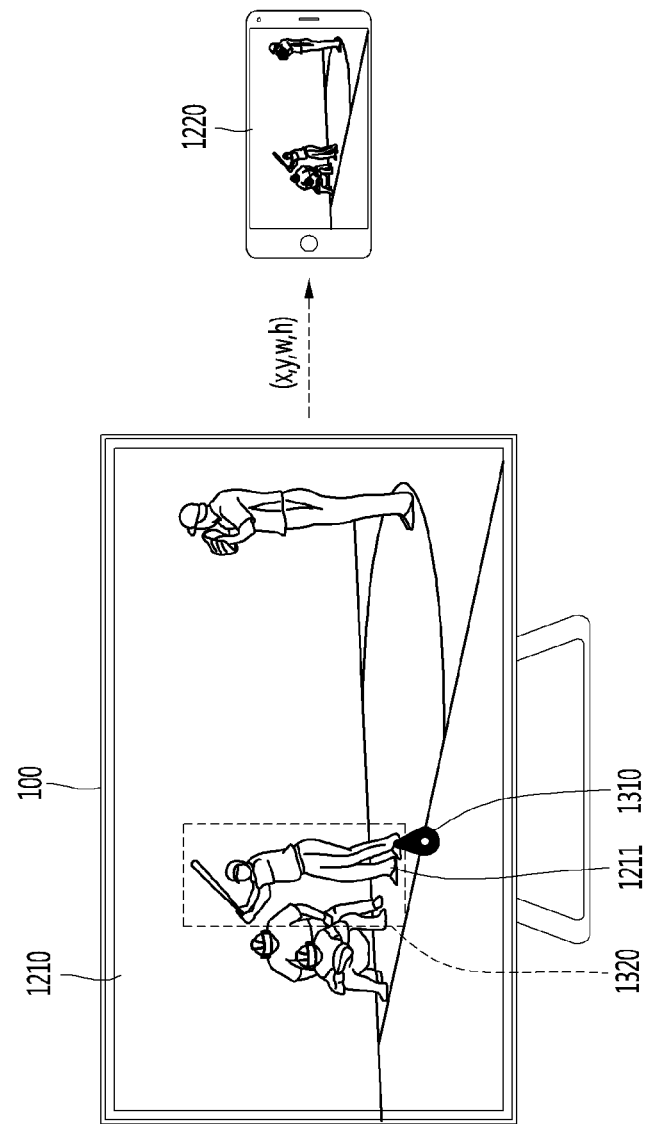

FIGS. 12 to 13 are diagrams illustrating a method of selecting an object to be tracked according to an embodiment of the present invention.

As shown in FIG. 12, when the display device 100 and the mobile terminal 500 are paired, the control unit 170 may pause output of the image of the first content such that a user selects an object, and display the paused image. The paused image may be the first image 1210 of the first content.

Meanwhile, as shown in FIG. 13, the control unit 170 may receive input of selecting a target object 1211 from among one or more objects included in the first image 1210. More specifically, a specific button of the remote control device 200 may be selected in a state in which a pointer 1310 is located on the target object 1211, such that the control unit 170 may receive input of selecting the target object 1211 from among one or more objects included in the first image 1210.

Meanwhile, although, when the display device 100 and the mobile terminal 500 are paired, output of the image is paused, the present invention is not limited thereto.

For example, when the display device 100 and the mobile terminal 500 are paired, the control unit 170 may display a guidance message indicating "Stop the image when a tracking target appears while the image is played back" and continuously output the image of the first content.

In addition, when input of pausing output of the image while the image of the first content is displayed, the control unit 170 may pause output of the image of the first content and display the paused image (first image 1210).

In this case, as shown in FIG. 13, the control unit 170 may receive input of selecting the target object 1211 from among one or more objects included in the first image 1210.

Meanwhile, although input of selecting the target object from the paused image is received in the present embodiment, the present invention is not limited thereto and the control unit 170 may receive input of selecting the target object even in a state in which output of the first content is not paused.

Meanwhile, a method of providing thumbnail images such that the user selects the target object may be implemented in the present invention.

More specifically, the control unit 170 may store one or more images of the first content in the storage unit 140. For example, the control unit 170 may store an image of the first content at a playback time of 5 minutes, an image of the first content at a playback time of 6 minutes, an image of the first content at a playback time of 7 minutes and an image of the first content at a playback time of 8 minutes in the storage unit 140.

Meanwhile, when the display device 100 and the mobile terminal 500 are paired or when input of displaying the paused image is received, the control unit 170 may display the image of one or more pieces of first content stored in the storage unit 140 as the thumbnail images.

Meanwhile, when input of selecting a specific thumbnail image among one or more thumbnail images is received, the control unit 170 may display the image of the first content corresponding to the selected thumbnail image on the full screen. In this case, the control unit 170 may receive input of selecting the target object included in the displayed image of the first content.

Meanwhile, if output of the image of the first content is paused in the display device 100, the mobile terminal 500 may display the image 1220 of the first content in a state in which output of the image of the first content is paused.

The present invention is not limited thereto and the control unit 580 of the mobile terminal 500 may continuously output the image of the first content regardless of pause of output of the image on the display device 100.

More specifically, the display device 100 may continuously acquire the image of the first content regardless of the pause of output of the image. For example, in a state in which output of the image of the first content is paused to display the first image of the first content, the second, third and fourth images of the first content temporally later than the first image may be continuously acquired.

In addition, the control unit 170 of the display device 100 may continuously transmit the continuously acquired images of the first content to the mobile terminal 500.

In this case, the control unit 580 of the mobile terminal 500 may continuously receive and display the image of the first content from the display device 100.

According to the present invention, it is possible to continuously provide the content using the mobile terminal even when output of the content is paused in the display device 100 such that the user selects the target object.

When selection of the target object is finished, the control unit 170 may unpause output of the first content and resume output of the first content.

As shown in FIG. 13, when input of selecting the target object 1211 from among one or more objects included in the first image 1210 is received, the control unit 170 may acquire information on the first coordinate of the target object 1211 included in the first image 1210.

Here, the information on the first target of the target object 1211 may include the coordinate value of the target object 1211 and information on the size of the target object 1211.

For example, the information on the first coordinate of the target object 1211 may include x, y, w, h values. Here, the x value may indicate a horizontal coordinate value of the left upper corner of the region 1320 in which the target object 1211 is located, the y value may indicate a vertical coordinate value of the left upper corner of the region in which the target object 1211 is located, the w value may indicate the width of the region 1320 in which the target object 1211 is located and the h value may indicate the height of the region 1320 in which the target object 1211 is located.

Meanwhile, the control unit 170 may transmit the information on the acquire first coordinate to the mobile terminal 500.

In this case, the control unit 170 may transmit the coordinates of the target object 1211 included in the first image 1210 to the mobile terminal 500 along with the first image 1210.

The present invention is not limited thereto and, when the first image 1210 is already transmitted to the mobile terminal 500, the control unit 170 may transmit the coordinates of the target object 1211 included in the first image 1210 to the mobile terminal 500 along with the time information of the first image 1211.

Meanwhile, the control unit 580 of the mobile terminal 500 may acquire information on the first coordinate of the target object 1211 of the first image 1210. More specifically, the control unit 580 of the mobile terminal 500 may receive the information of the first coordinate of the target object 1210 of the first image 1210 from the display device 100.

Meanwhile, based on the first image 1210 and the first coordinate of the target object 1211 of the first image 1210, the control unit 580 of the mobile terminal 500 may acquire information on the target object among one or more objects included in the first image 1220 received from the mobile terminal 500.

More specifically, when the first image 1210 and the first coordinate of the target object 1211 of the first image 1210 are received, the control unit 580 may acquire information on the target object among one or more objects included in the received first image 1220.

For example, the first image 1210 may include a player A with uniform number 10 and a player B with uniform number 13. If the player with uniform number 10 is selected as a target object, the control unit 580 may receive the first coordinate of the player A with uniform number A. In this case, based on the first image 1220 including the player A with uniform number 10 and the player B with uniform number 13 and information on the first coordinate of the player A with uniform number 10 of the first image 1210, the control unit 580 may determine that the target object is the player A with uniform number 10.

Meanwhile, if the first coordinate of the target object 1211 included in the first image 1210 and the time information of the first image 1210 of the first content are received, the control unit 580 of the mobile terminal 500 may acquire the first image 1220 corresponding to the first image 1210 of the first content among the plurality of images acquired by the mobile terminal 500 based on the time information of the first image 1210 and acquire information on the target object among one or more objects included in the first image 1220 based on the acquired image and the first coordinate.

For example, in a state in which output of the image of the first content is paused in the display device 100 to display the first image of the first content, the display device 100 may continuously transmit a plurality of images temporally later than the first image of the first content to the mobile terminal 500.

In addition, the mobile terminal 500 may store the plurality of images received from the display device 100 in the storage unit 570.

In addition, when the target object included in the first image 1210 is selected, the control unit 170 of the display device 100 may transmit the time information of the first image 1210 and the information on the coordinate of the target object of the first image 1210 to the mobile terminal 500.

In this case, the control unit 580 of the mobile terminal 500 may acquire the first image 1220 corresponding to the first image 1210 among the plurality of images stored in the storage unit 570 based on the time information of the acquired first image 1210.

In addition, based on the first image 1220 stored in the storage unit 170 and the information on the coordinate of the target object of the first image 1210, the control unit 580 of the mobile terminal 500 may acquire the information on the target object among one or more objects included in the first image 1220.

Although the information on the target object is acquired based on the information received by the display device 100 in the present embodiment, the present invention is not limited thereto.

This will be described with reference to FIG. 14.

Figure 14:
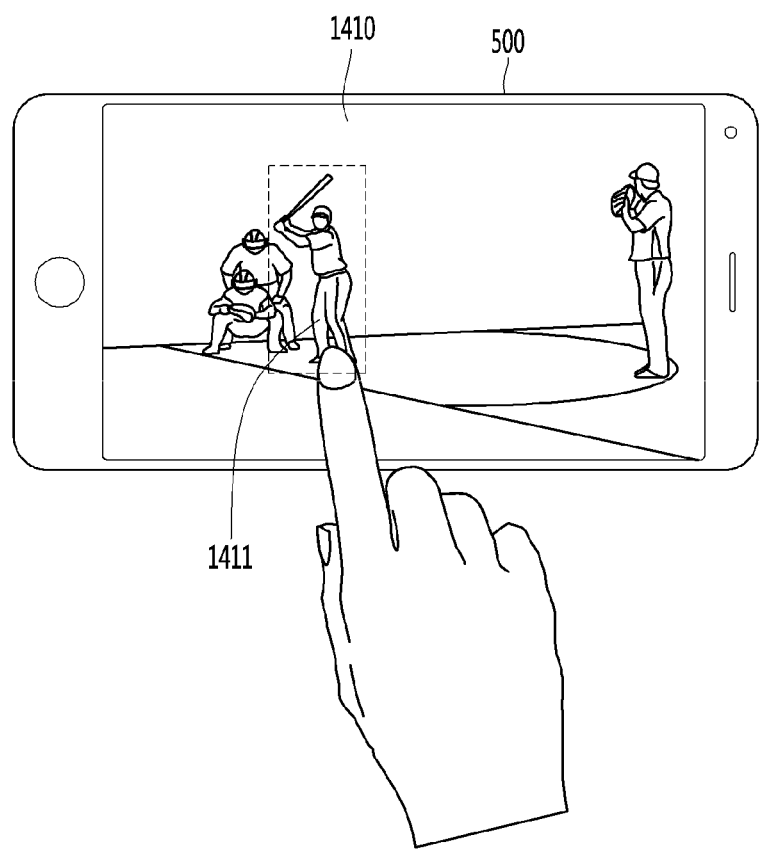
FIG. 14 is a diagram illustrating a method of selecting a target object in a mobile terminal 500 according to an embodiment of the present invention.

FIG. 14 is a diagram illustrating a method of selecting a target object in a mobile terminal 500 according to an embodiment of the present invention.

When the display device 100 and the mobile terminal 500 are paired, the control unit 580 of the mobile terminal 500 may receive the first image of the first content from the display device 100 and display the received first image of the first content.

Meanwhile, as shown in FIG. 14, the control unit 580 may receive input of selecting the target object 1411 among one or more objects included in the first image 1410. More specifically, when input of touching a region in which the target object 1411 is displayed is received, the control unit 580 may receive input of selecting the target object 1411 among one or more objects included in the first image 1410.

Meanwhile, although the mobile terminal 500 receives and displays the first image when the display device 100 and the mobile terminal 500 are paired, the present invention is not limited thereto.

For example, when the display device 100 and the mobile terminal 500 are paired, the control unit 580 of the mobile terminal 500 may continuously output the image of the first content. For example, the control unit 580 of the mobile terminal 500 may continuously receive the second, third and fourth images of the first content from the display device 100 and display the received images.

Meanwhile, while the images of the first content are displayed, the control unit 580 may display a guidance message indicating "Stop the image when a tracking target appears while the image is played back".

In addition, when input of pausing output of the image while the images of the first content are displayed, the control unit 580 may pause output of the images of the first content and display the paused image.

In this case, the control unit 580 may receive input of selecting a target object from among one or more objects included in the pause image.

Meanwhile, regardless of pause of output of the images of the first content in the mobile terminal 580, the display device 100 may continuously output the images of the first content.

The method of selecting the target object using the above-described thumbnail images is also applicable to the mobile terminal 500 without change.

When input of selecting the target object 1411 is received, the control unit 580 may acquire information on the target object 1411 among one or more objects included in the first image 1410.

More specifically, when input of selecting the target object 1411 is received, the control unit 580 may acquire what the target object 1411 is among one or more objects of the first image 1410.

For example, the first image 1410 may include a player A with uniform number 10 and a player B with uniform number 13. When the player A with uniform number 10 is selected as a target object, the control unit 580 may determine that the target object is the player A with uniform number 10.

Figure 15:
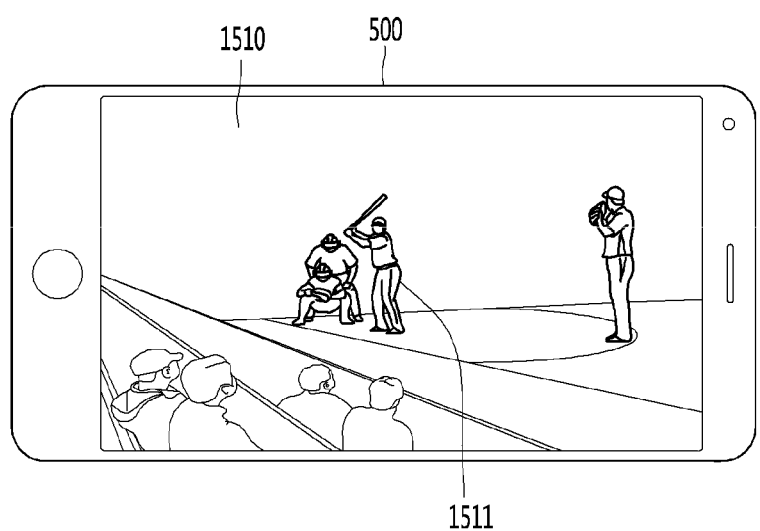
FIG. 15 is a diagram illustrating a method of acquiring information on a second coordinate of a target object of a second image of first content.

FIG. 15 is a diagram illustrating a method of acquiring information on a second coordinate of a target object of a second image of first content.

The control unit 580 of the mobile terminal 500 may receive the second image 1510 of the first content from the display device 100. More specifically, when the display device 100 acquires and transmits the second image of the first content to the mobile terminal 500, the control unit 580 of the mobile terminal 500 may receive the second image 1510 of the first content from the display device 100. Here, the second image 1510 of the first content may be an image temporally later than the first image 1410 of the first content.

More specifically, if the first content is broadcast content provided by a broadcast provider through a specific channel, the second image 1510 of the first content may be an image broadcast temporally later than the first image 1410 of the first content. For example, if the first image 1410 of the first content is an image at 10 minutes 27 seconds in the football game, the second image 1510 of the first content is an image at 10 minutes 38 seconds in the football game.

The control unit 580 of the mobile terminal 500 may display the second image 1510 of the first content.

The second image 1510 of the first content may include a target object 1511.

The target object 1411 included in the first image 1410 of the first content and the target object 1511 included in the second image 1510 of the first content may be the same. The target object 1411 included in the first image 1410 of the first content and the target object 1511 included in the second image 1510 of the first content do not need to be equal to each other in terms of shape and position.

For example, the target object 1411 included in the first image 1410 may be a person A located in a first region of the screen with a first posture and the target object 1611 included in the second image 1610 may be a person A located in a second region of the screen with a second posture.

Based on the information on the target object 1411 included in the first image 1410, the control unit 580 of the mobile terminal 500 may acquire information on the second coordinate of the target object 1511 of the second image 1510.

More specifically, based on the information on the target object 1411 included in the first image 1410, the control unit 580 of the mobile terminal 500 may determine which object is equal to the target object 1411 included in the first image 1410 among one or more objects included in the second image 1510. For example, if the target object 1411 included in the first image 1410 is a player A with uniform number 10 and the first object (the player A with uniform number 10) and the second object (the player B with uniform number 13) are included in the second image 1510, the control unit 580 may determine that the first object (the player A with uniform number 10) included in the second image 1510 is equal to the target object included in the first image 1410. That is, the control unit 580 may determine that the first object included in the second image 1510 is a target object.

The control unit 580 may acquire information on the second coordinate of the target object 1511 of the second image 1510. The coordinate acquisition method and the data included in the coordinate information are equal to the above-described method of acquiring the coordinates of the target object of the first information and the data included in the coordinate information.

Although an example of displaying the second image 1510 of the first content is described, the present invention is not limited thereto. More specifically, the control unit 580 of the mobile terminal 500 may acquire only the coordinates of the target object 1511 of the second image 1510 of the first content based on the received second image 1510 of the first content without displaying the second image 1510 of the first content.

The control unit 580 may transmit the information on the second coordinate of the target object 1511 of the second image 1510 to the display device 100.

The control unit 580 may transmit the time information of the second image 1510 to the display device 100 along with the information on the second coordinate of the target object 1511 of the second image 1510.

Figure 16:
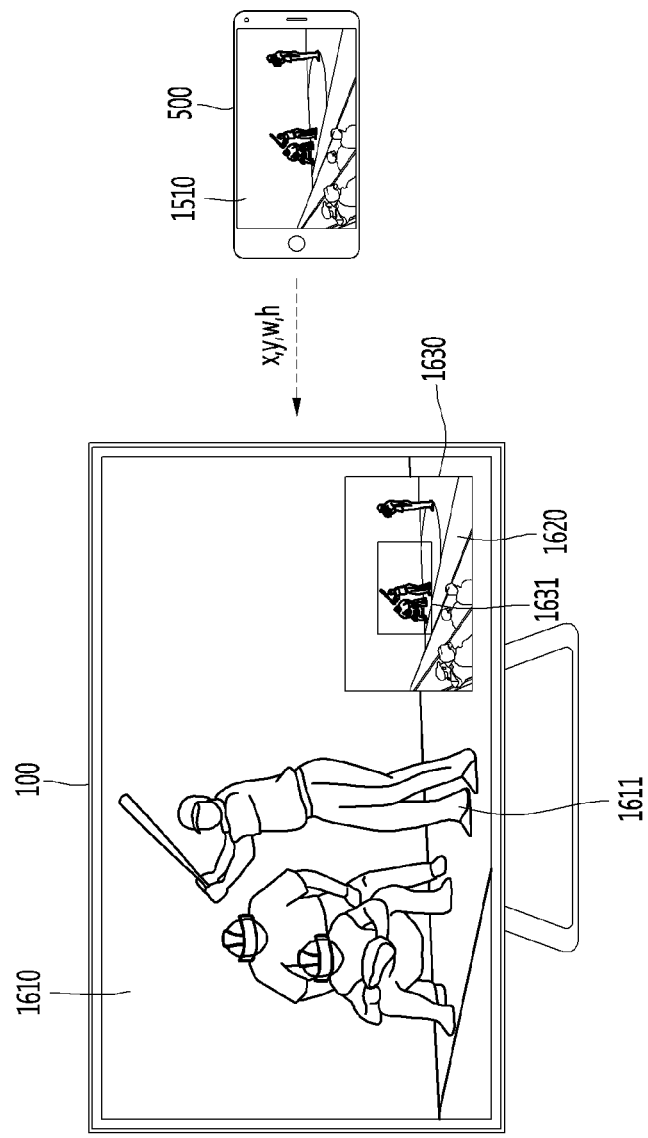
FIG. 16 is a diagram illustrating a method of acquiring and displaying an image tracking a target object from a second image according to an embodiment of the present invention.

FIG. 16 is a diagram illustrating a method of acquiring and displaying an image tracking a target object from a second image according to an embodiment of the present invention.

The control unit 170 of the display device 100 may receive the information on the second coordinate of the target object 1511 of the second image 1510 from the mobile terminal 500.

In addition, based on the received information on the second coordinate of the target object 1511 of the second image 1510, the control unit 170 may acquire an image including the target object from the second image.

In the above description, the display device 100 acquires the second image of the first content and transmits the acquired second image to the mobile terminal 500.

In addition, when the information on the second coordinate of the target object 1511 of the second image 1510 is received, the control unit 170 may acquire an image tracking the target object from the acquired second image.

More specifically, the control unit 170 may acquire the information on a region, in which the target object is located, of the second image acquired by the display device 100, based on the information on the second coordinate of the target object 1511 of the second image 1510.

For example, if the received coordinates are (X, Y, W, H)=(720, 380, 100, 50), the control unit 170 may determine that the region, in which the target object is located, of the second image acquired by the display device 100 is a region corresponding to the coordinates (X, Y, W, H)=(720, 380, 100, 50).

In this case, the control unit 170 may acquire the image including the image of the region of the coordinates (X, Y, W, H)=(720, 380, 100, 50), that is, the image tracking the target object, from the second image.

The image tracking the target object, which is acquired from the second image, may be an image which includes the target object and is magnified from the first image.

In this case, the control unit 170 may acquire the image, which includes the target object and is magnified from the first image, from the second image, based on a predetermined magnification.

The control unit 170 may display the acquired image 1610. More specifically, the control unit 170 may display the image acquired from the second image, that is, the image, which includes the target object and is magnified from the first image.

In this case, the displayed image may be a portion of the acquired second image. More specifically, as the scale of the image increases, only the portion of the acquired second image may be displayed on the screen and the other portion of the second image may be included in a cut region not to be displayed.

The displayed image 1610 may include a target object 1611 and the target object 1611 may be located at the center of the displayed image 1610. The present invention is not limited thereto and the target object 1611 may be located in a specific region of the displayed image 1610.

The time information acquired from the mobile terminal 500 may be used to acquire the image from the second image. More specifically, the control unit 170 may receive the time information of the second image from the mobile terminal 500 and determine what the image tracking the object is based on the received time information. In addition, when the received time information is equal to the time information of the second image among the plurality of images acquired from the display device 100, the control unit 170 may acquire the image tracking the target object from the second image.

The image 1610 tracking the target object acquired from the second image may be displayed on the full screen as shown in FIG. 16.

The control unit 170 may display a PIP window 1630 along with the image 1610 including the target object acquired from the second image. Here, the PIP window 1630 may include the second image 1620, that is, the whole of the second image.

In addition, the PIP window may include a UI 1631 indicating the region of the image displayed on the screen 1620 in the second image 1620. That is, the control unit 170 may display the UI 1631 indicating the region of the image currently displayed on the full screen of the entire region of the second image (that is, the image 1610 tracking the target object acquired from the second image).

The PIP window 1630 may be displayed in one region of the screen. Here, one region of the screen may be a region in which the PIP window 1630 is predetermined to be displayed. The present invention is not limited thereto and the position of the PIP window 1630 may be variously changed according to the position of the object 1611 displayed on the screen. For example, the control unit 170 may change the position of the PIP window 1630 and display the PIP window such that the object 1611 is not concealed by the PIP window 1630.

In the present invention, in object tracking requiring high-speed operation, operation for object tracking is assigned to another device, thereby reducing cost and resources of a TV while using the remaining resources of the mobile terminal.

The display device 100 currently displays a magnified image including the target object, that is, the image tracking a target object. The mobile terminal 500 may display the full image of the second image, such that the user views the full image through the mobile terminal 500 if the PIP window is not displayed. In addition, it is possible to easily control display of the image on the display device 100 using the mobile terminal 500.

Figure 17:
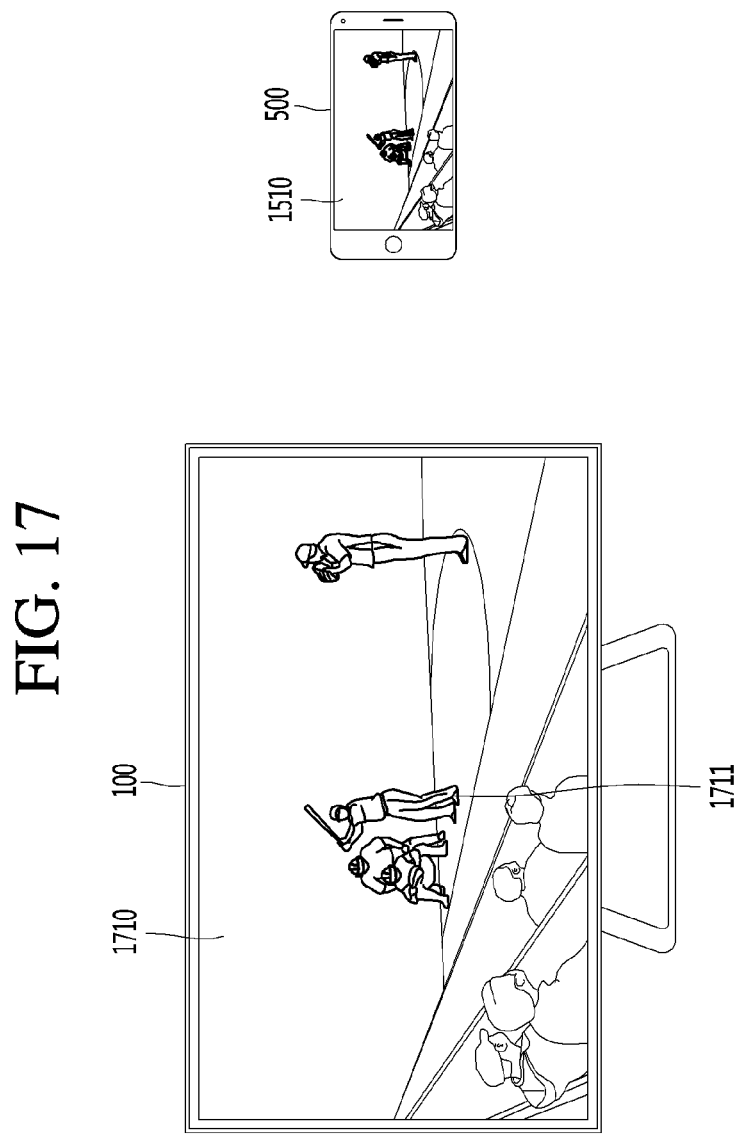
FIGS. 17 to 19 are diagrams illustrating a method of adjusting the scale of an image displayed on a display device using a mobile terminal according to an embodiment.
Figure 18:
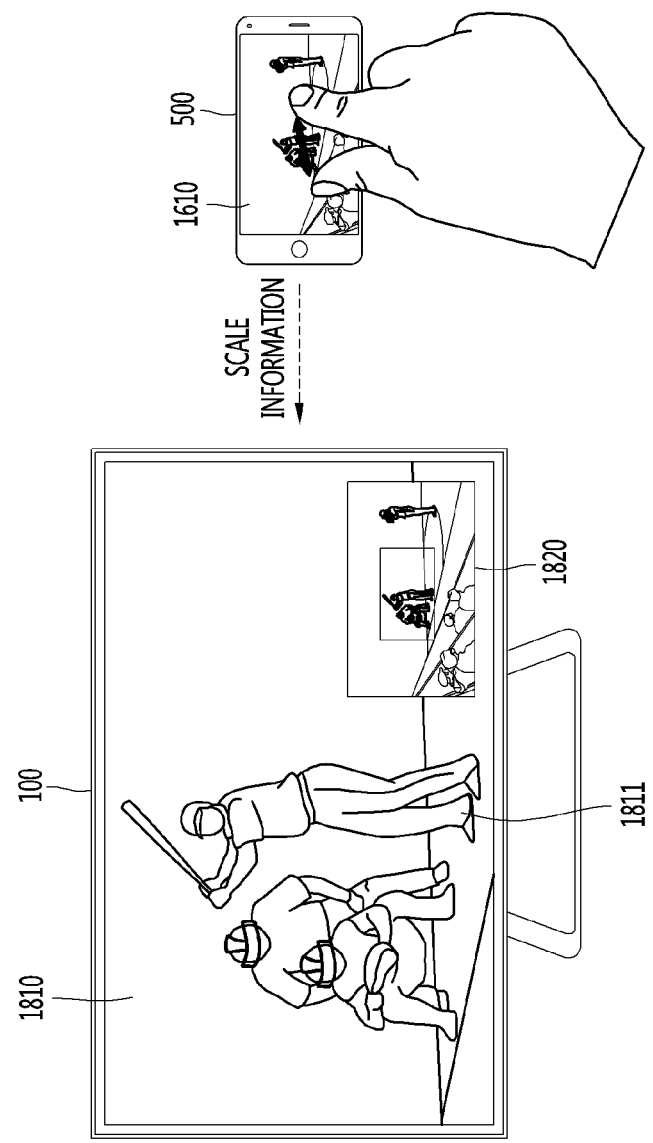
Figure 19:
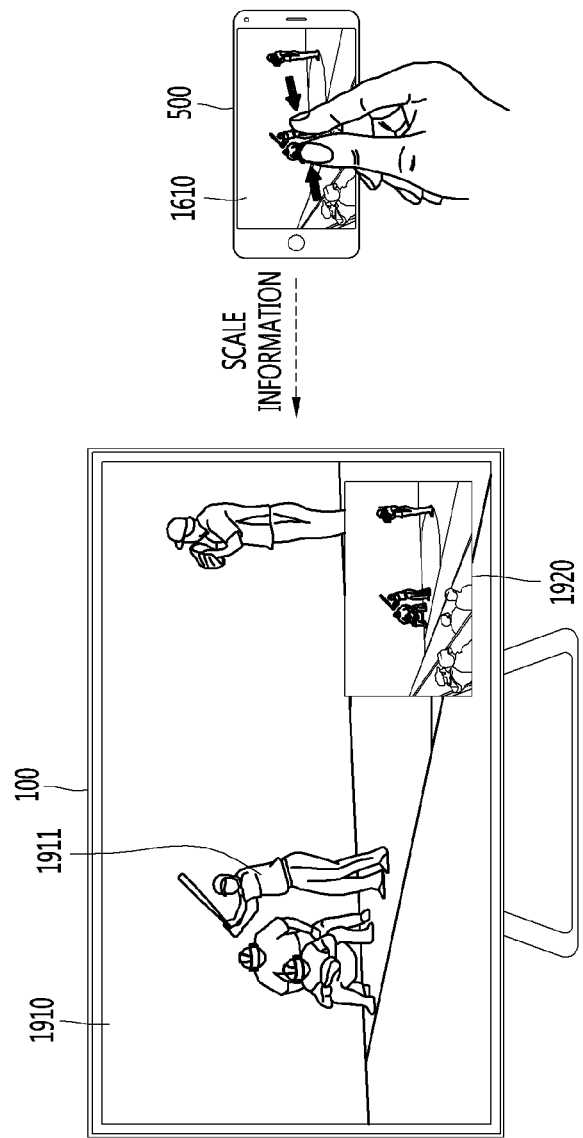

FIGS. 17 to 19 are diagrams illustrating a method of adjusting the scale of an image displayed on a display device using a mobile terminal according to an embodiment.

In FIG. 17, the mobile terminal 500 currently displays the second image 1510 acquired and transmitted by the display device 100 and the display device 100 currently displays the image 1710 tracking the target object 1711.

Meanwhile, the control unit 580 of the mobile terminal 500 may receive input of specifying the scale of the image tracking the target object in the display device 100. More specifically, the control unit 580 may receive at least one of input of increasing the scale of the image tracking the target object in the display device 100 and input of decreasing the scale of the image tracking the target object in the display device 100.

For example, as shown in FIG. 18, the control unit 580 may receive pinch-out input of the touchscreen of the mobile terminal 500. In this case, the control unit 580 may determine the pinch-out input as input of increasing the scale of the image including the target object in the display device 100 and acquire information on the degree of increasing the scale of the image from a pinch-out distance.

The control unit 580 of the mobile terminal 500 may transmit scale information to the display device 100. Here, the scale information may include information indicating whether the scale of the image is increased or decreased or information on the degree of increasing or decreasing the scale of the image. As another example, the scale information may be information on a scale relative to a default scale.

When the scale information of the image including the target object is received from the mobile terminal 500, the control unit 170 of the display device 100 may acquire and display the image corresponding to the scale of the target object.

For example, if the scale information received from the mobile terminal 500 includes information for magnifying the image by a specific magnification factor, the control unit of the display device 100 may acquire and display an image 1810 including a specific object 1811 and magnified from the image 1710 displayed in FIG. 17 by the specific magnification factor from the second image, as shown in FIG. 18.

As another example, as shown in FIG. 19, the control unit 580 may receive pinch-in input of the touchscreen of the mobile terminal 500. In this case, the control unit 580 may determine the pinch-in input as input of decreasing the scale of the image including the target object in the display device 100 and acquire information on the degree of decreasing the scale of the image from a pinch-in distance.

The control unit 580 of the mobile terminal 500 may transmit the scale information of the displayed image including the target object to the display device 100.

When the scale information received from the mobile terminal 500 includes information for reducing the image by a specific magnification factor, the control unit of the display device 100 may acquire and display an image 1910 including a specific object 1911 and magnified from the image 1810 displayed in FIG. 18 by a specific magnification factor from the third image, as shown in FIG. 19. Here, the third image may be an image temporally later than the second image.

In the present invention, the mobile terminal can select the object and adjusting the scale of the image displayed on the display device, thereby controlling output of the image on the display device using the mobile terminal familiar to the user.

FIGS. 20 to 21 are diagrams illustrating a method of changing an acquisition region of an image including a specific object using a mobile terminal.

In FIG. 20, the mobile terminal 500 currently displays the second image acquired and transmitted by the display device 100 and the display device 100 currently displays a magnified image including a target object 2011, that is, an image 2010 tracking a target object.

The control unit 580 of the mobile terminal 500 may display a first UI 2020 indicating a region occupied by the image 2010 tracking the target object in the second image.

The control unit 580 of the mobile terminal 500 may receive input of changing the region of the image acquired from the second image. More specifically, the control unit 580 of the mobile terminal 500 may receive input of touching a touchscreen and performing dragging. For example, as shown in FIG. 21, the control unit 580 may receive input of touching the touchscreen and performing dragging to the right.

As another example, the control unit 580 may receive input of touching a region in which a first UI 2020 is displayed and then performing dragging. In this case, as shown in FIG. 21, the control unit 580 may move and display the first UI 2020 by a dragging distance in a dragging direction.

The control unit 580 of the mobile terminal 500 may acquire and transmit information on at least one of the dragging direction and the dragging distance to the display device 100.

When the information on at least one of the dragging direction and the dragging distance is received, the control unit 170 of the display device 100 may acquire and display an image including a specific object from the second image (or images temporally later than the second image), based on at least one of the dragging direction and the dragging distance.

For example, if input of touching the touchscreen of the mobile terminal 500 and performing dragging by a specific length is received, the control unit 170 of the display device 100 may acquire and display an image 2110 further including a right region of a target object from the second image (or the images temporally later than the second image), as shown in FIG. 21. In this case, the range of the right region of the target object to be included may correspond to the dragging distance after touch.

In the present invention, it is possible to easily control the location of the target object in the image tracking the target object using the mobile terminal.

If a plurality of temporally continuous images of the first content is displayed using the above-described method, the target object of the plurality of images of the first content may be tracked by the mobile terminal. For example, the display device 100 may transmit the images of the frames of a baseball game continuously received through the tuner 131 to the mobile terminal 500 and the mobile terminal 500 may acquire the coordinates of the target object from the images of the frames of the baseball game. In addition, the display device 100 may acquire and display an image including the target object from the images of the frames of the baseball game based on the coordinates of the target object corresponding to the images of the frames of the baseball game.

The control unit 170 of the display device 100 may store the plurality of temporally continuous images of the first content in the storage unit 140.

In addition, the control unit 170 of the display device 100 may store at least one of coordinate information of the plurality of target objects corresponding to the plurality of temporally continuous images of the first content and scale information corresponding to the plurality of temporally continuous images of the first content in the storage unit 140.

For example, the control unit 170 of the display device 100 may store information on the coordinates of the target objects of the images of the frames of the baseball game in the storage unit 140. In this case, the information on the coordinates of the target objects of the images of the frames may be stored along with the time information of the images of the frames or in correspondence with the images of the frames.

As another example, the control unit 170 of the display device 100 may store the information on a plurality of scales corresponding to the images tracking the plurality of target objects in the storage unit 140, if the images tracking the plurality of target objects are acquired from the images of the plurality of frames of the baseball game.

When input of replaying the first content is received, the control unit 170 may acquire and display the images tracking the target object from the plurality of temporally continuous images of the first content, based on the plurality of coordinates stored in the storage unit 140.

For example, the control unit 170 may acquire and display the image tracking the target object from the image of the first frame using the coordinates of the target object matching the image of the first frame and then acquire and display the image tracking the target object from the image of the second frame using the coordinates of the target object matching the image of the second frame subsequent to the first frame.

In addition, the control unit 170 may acquire the image tracking the target object from the plurality of temporally continuous images of the first content, such that the image tracking the target object is displayed with the plurality of scales, based on the plurality of scales stored in the storage unit 140.

In the present invention, even when content recorded by a user is provided again, it is possible to provide the same image as the image viewed by the user again.

The control unit 170 may transmit replay information of the first content to a server (not shown). Here, the replay information of the first content may include information for identifying the first content, time information of the plurality of temporally continuous images of the first content, information on the plurality of coordinates corresponding to the plurality of temporally continuous images of the first content and the scale information of the plurality of temporally continuous images of the first content.

For example, the control unit 170 may transmit information for identifying a baseball game broadcast through a specific channel at a specific time, time information of the images of a plurality of temporally continuous frames of the baseball game and information on a plurality of coordinates corresponding to the images of the plurality of frames of the baseball game to the server (not shown).

In this case, the user of another display device (not shown) may download the replay information of the first content and play the first content back using the same method as the method of playing the first content back in the first display device.

More specifically, the other display device (not shown) may acquire and store the first content and receive replay information of the first content from the server (not shown).

In addition, the other display device (not shown) may acquire and display the image including the target object from each of the plurality of temporally continuous images of the first content based on the replay information of the first content.

For example, assume that the replay information includes the time information of the image of the first frame of a specific football game, coordinate information of the target object of the image of the first frame, the scale information of the image of the displayed first frame, the time information of the image of the second frame of the first content, the coordinate information of the target object of the image of the second frame and the scale information of the image of the displayed second frame, the time information of the image of the third frame of the first content, the coordinate information of the target object of the image of the third frame and the scale information of the image of the displayed third frame.

In this case, the other display device (not shown) may display the same image as the image displayed on the first display device 100 based on the received replay information.

For example, the other display device (not shown) may acquire and display the image including the same object as the target object tracked in the first display device 100 and magnified by the same magnification factor as the image displayed on the first display device 100, using the time information of the image of the first frame of the first content, the coordinate information of the target object of the image of the first frame and the scale information of the displayed image of the first frame. Then, the other display device (not shown) may acquire and display the image including the same object as the target object tracked in the first display device 100 and magnified by the same magnification factor as the image displayed on the first display device 100, using the time information of the image of the second frame of the first content, the coordinate information of the target object of the image of the second frame and the scale information of the displayed image of the second frame. Using a similar method, the other display device (not shown) may acquire and display the magnified image including the target object from the image of the third frame of the first content.

Although the replay information is transmitted to the server in the present embodiment, the present invention is not limited thereto and may be shared by direct communication between the display device and the other display device.

In the present invention, the replay information can be shared between other devices, such that a viewer views the same image as an image viewed by another user.

Although a first device is a display device 100 and a second device is a mobile terminal 500 in the above description, the present invention is not limited thereto. For example, the second device may be a display device 100 and may be an electronic device without a display function for acquiring and transmitting the coordinates of a target object from an image. In addition, the first device may be a TV or a mobile terminal 500 or may include all electronic devices including a display function.

The control unit 170 may serve to control the device and may be used interchangeably with a central processing unit, a microprocessor or a processor.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method of operating a display device, the method comprising:
   displaying a first image corresponding to a first frame of first content, wherein the first content is video and the first image includes a target object;
   receiving, from a second display device, information on a second coordinate of the target object included in a second image corresponding to a second frame of the first content, wherein the second frame is temporally later than the first frame within the first content;
   acquiring an image tracking the target object from the second image based on the information on the second coordinate of the target object; and
   displaying the acquired image,
   wherein the acquired image tracking the target object comprises a region where the target object is located within the second image acquired by the display device based on the information on the second coordinate of the target object.

2. The method according to claim 1, wherein the image tracking the target object includes the target object and magnified from the first image.

3. The method according to claim 1, further comprising:
   receiving input of selecting the target object from among one or more objects included in the first image;
   acquiring information on a first coordinate of the target object included in the first image; and
   transmitting information on the first coordinate to the second display device.

4. The method according to claim 1, wherein the displaying the acquired image includes displaying the acquired image on a full screen and displaying a PIP window including the second image in one region of the screen.

5. The method according to claim 1, further comprising receiving information on a scale of the image tracking the target object from the second display device,
   wherein the acquiring the image tracking the target object from the second image includes acquiring an image corresponding to the scale of the image tracking the target object from the second image based on the information on the scale of the image tracking the target object.

6. The method according to claim 1, further comprising:
   storing a plurality of temporally continuous images of the first content;
   storing information on a plurality of coordinates corresponding, respectively, to the plurality of images, wherein the information on the plurality of coordinates is received from the second display device; and
   acquiring and displaying the image tracking the target object from the plurality of images based on the plurality of coordinates if input of replaying the first content is received.

7. A display device comprising:
   a display unit for displaying an image;

a communication unit for communicating with a second display device; and a control unit for:

controlling the display unit to display a first image corresponding to a first frame of first content, wherein the first content is video and the first image includes a target object, receiving, from the second display device via the communication unit, information on a second coordinate of the target object included in a second image corresponding to a second frame of the first content, wherein the second frame is temporally later than the first frame within the first content, acquiring an image tracking the target object from the second image based on the information of the second coordinate of the target object, and controlling the display unit to display the acquired image, wherein the acquired image tracking the target object comprises a region where the target object is located within the second image acquired by the display device based on the information on the second coordinate of the target object.

8. The display device according to claim 7, wherein the image tracking the target object includes the target object and magnified by the first image.

9. The display device according to claim 7, further comprising an input unit for receiving input from a user, wherein the controller receives input of selecting the target object from among one or more objects included in the first image through the input unit, acquires information on a first coordinate of the target object included in the first image, and transmits information on the first coordinate to the second display device through the communication unit.

10. The display device according to claim 7, wherein the control unit displays the acquired image on a full screen and displays a PIP window including the second image in one region of the screen.

11. The display device according to claim 7, wherein the controller receives information on a scale of the image tracking the target object from the second display device through the communication unit and acquires an image corresponding to the scale of the image tracking the target object from the second image based on the information on the scale of the image tracking the target object.

12. The display device according to claim 7, further comprising a storage unit, wherein the controller stores a plurality of temporally continuous images of the first content, stores information on a plurality of coordinates corresponding, respectively, to the plurality of images, wherein the information on the plurality of coordinates is received from the second display device, and acquires and displays the image tracking the target object from the plurality of images based on the plurality of coordinates if input of replaying the first content is received.

13. A second display device comprising:

a communication unit for communicating with a first display device; and a control unit for:

receiving a first image corresponding to a first frame of first content from the first display device through the communication unit, wherein the first content is video, acquiring information on a target object from one or more objects included in the first image, receiving a second image corresponding to a second frame of the first content from the first display device through the communication unit, wherein the second frame is temporally later than the first frame within the first content, acquiring information on a second coordinate of the target object included in the second image based on the information on the target object included in the first image, and transmitting the information on the second coordinate to the first display device through the communication unit.

14. The second display device according to claim 13, wherein the controller receives the information on the first coordinate of the target object included in the first image from the first display device and acquires the information on the target object using the first image and the information on the first coordinate.

15. The second display device according to claim 13, further comprising:

a display unit for displaying an image; and an input unit for receiving input from a user, wherein the controller controls the display unit to display the first image, acquires the information on the target object by receiving input of selecting the target object from among one or more objects included in the first image.

16. The second display device according to claim 13, further comprising an input unit for receiving input from a user, wherein the control unit receives input of setting a scale of an image tracking the target object through the input unit and transmitting information on the scale of the image tracking the target object to the first display device.

* * * * *